(12) United States Patent
Minert

(10) Patent No.: US 9,661,149 B2
(45) Date of Patent: *May 23, 2017

(54) TELEPHONY SYSTEMS USING CLOUD COMPUTING FOR INTERCONNECTING BUSINESSES AND CUSTOMERS

(71) Applicant: inContact, Inc., Midvale, UT (US)

(72) Inventor: Brian Douglas Minert, Orem, UT (US)

(73) Assignee: inContact, Inc., Salt Lake City, UT (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/922,157

(22) Filed: Jun. 19, 2013

(65) Prior Publication Data

US 2013/0279669 A1 Oct. 24, 2013

Related U.S. Application Data

(60) Division of application No. 12/957,156, filed on Nov. 30, 2010, now Pat. No. 8,478,848, which is a continuation-in-part of application No. 12/861,717, filed on Aug. 23, 2010, now Pat. No. 8,223,948.

(51) Int. Cl.
 *H04M 11/06* (2006.01)
 *H04L 29/08* (2006.01)
 *H04L 29/06* (2006.01)
 *G06F 9/50* (2006.01)

(52) U.S. Cl.
 CPC .......... *H04M 11/06* (2013.01); *G06F 9/5072* (2013.01); *H04L 29/06027* (2013.01); *H04L 29/08189* (2013.01)

(58) Field of Classification Search
None
See application file for complete search history.

(56) References Cited

U.S. PATENT DOCUMENTS

| | | | |
|---|---|---|---|
| 5,737,393 A * | 4/1998 | Wolf | 379/88.13 |
| 8,737,593 B2 * | 5/2014 | Lawson | G06F 9/505 379/220.01 |
| 2006/0077958 A1 * | 4/2006 | Mallya et al. | 370/352 |
| 2007/0286180 A1 * | 12/2007 | Marquette et al. | 370/356 |
| 2010/0131324 A1 * | 5/2010 | Ferris | G06Q 10/0631 705/7.12 |

(Continued)

OTHER PUBLICATIONS

TeamQuest, "Capacity Planning, Discipline for Data Center Decisions", published before May 20, 2006.*

(Continued)

*Primary Examiner* — Khaled Kassim
*Assistant Examiner* — Zhaohui Yang
(74) *Attorney, Agent, or Firm* — Pearl Cohen Zedek Latzer Baratz LLP

(57) ABSTRACT

A multi-tiered communication system for provisioning a cloud computing system to host a media server. The system includes a data center including one or more Interactive Voice Recognition (IVR) functions that are configured for use with a caller who initiates contact with the data center. The system also includes a media server implemented in a cloud computing system. The media server is configured to route an incoming call from one subscriber to another, or in the case of a caller to the data center, to route one or more IVR messages to the caller and to connect the caller with an agent for real-time communication.

11 Claims, 18 Drawing Sheets

(56) References Cited

U.S. PATENT DOCUMENTS

| | | | |
|---|---|---|---|
| 2010/0169477 A1* | 7/2010 | Stienhans et al. | 709/224 |
| 2011/0179162 A1* | 7/2011 | Mayo | G06F 9/5077 709/224 |
| 2011/0238515 A1* | 9/2011 | Diwakar | 705/26.1 |
| 2013/0346899 A1* | 12/2013 | Cole et al. | 715/771 |

OTHER PUBLICATIONS

Mell et al, "The NIST Definition of Cloud Computing", http://www.nist.gov/itl/cloud/upload/cloud-def-v15.pdf, Oct. 7, 2009.*

* cited by examiner

1400

1410
Determining That Demand For Resources Of An Existing Media Server In A Location Has Increased To A Level Where It Is Desirable For Additional Media Server Resources 1420
Contacting A Cloud Computing System That Is Located In The Location Of The Existing Media Server 1430
Provisioning The Cloud Computing System To Implement Additional Media Server Resources That Are Similar To The Resources Of The Existing Media Server So As To Remove Demand From The Existing Media Server

*Figure 14*

TELEPHONY SYSTEMS USING CLOUD COMPUTING FOR INTERCONNECTING BUSINESSES AND CUSTOMERS

CROSS-REFERENCE TO RELATED APPLICATIONS

This application is a divisional application of U.S. patent application Ser. No. 12/957,156, filed Nov. 30, 2010, entitled "TELEPHONY SYSTEMS USING CLOUD COMPUTING FOR INTERCONNECTING BUSINESSES AND CUSTOMERS", which is a continuation-in-part of U.S. patent application Ser. No. 12/861,717, filed on Aug. 23, 2010, entitled "MULTI-TIERED MEDIA SERVICES FOR GLOBALLY INTERCONNECTING BUSINESSES AND CUSTOMERS", both of which are incorporated herein by reference in their entireties.

BACKGROUND

Communication and business systems are becoming globalized for many companies due to the capacity and reach of the internet. There are connectivity challenges in doing this for many companies when it comes to managing streaming media between geographically-dispersed customers, geographically-dispersed company representatives, and company servers housed in a few fixed locations.

Globalized communications commonly involve longer geographic distances when compared to domestic communications. Longer distances between communicating parties suffer from longer propagation delays, which will often degrade the quality of the communication experience between the parties.

The subject matter claimed herein is not limited to embodiments that solve any disadvantages or that operate only in environments such as those described above. Rather, this background is only provided to illustrate one area of technology where some embodiments described herein may be practiced.

BRIEF SUMMARY

One embodiment disclosed herein relates to a method for provisioning a cloud computing system to provide media server functionality in a telephony system in response to an increase in demand. The method includes determining that demand for resources of an existing media server in a location has increased to a level where it is desirable for additional media server resources.

The method further includes contacting a cloud computing system and provisioning the cloud computing system to implement one or more additional media servers that include similar resources as the existing media server so as to remove demand from the existing media server.

In one embodiment, the media server may be part of a general telephony system. Thus, when the media server is implemented in the cloud computing system, the media server may be configured to receive an incoming communication from a first caller and then provide the communication to a second caller. In this way, the media server directly connects the two callers.

Another embodiment disclosed herein relates to a method for provisioning a cloud computing system to implement a media server as part of a telephony system. The telephony system includes a data center and a media center for connecting a first user and second user in the telephony system so that two first and second users may communicate with each other.

The method includes contacting a cloud computing system that has available infrastructure that can be used to implement a media server of a telephony system. The method also includes provisioning the cloud computing system to perform the following: host the media server using the infrastructure of the cloud computing system; receive an incoming communication from the first user at the media server hosted by the cloud computing system; determine, based on the incoming communication, that the communication is to be sent to the second user; and forward the communication to the second user so that the first and second users are able to communicate in real time with each other.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 14 illustrates a flowchart of a method for provisioning a cloud computing system to implement a media server in response to increased demand on an existing media server.

DETAILED DESCRIPTION

Figure 1:
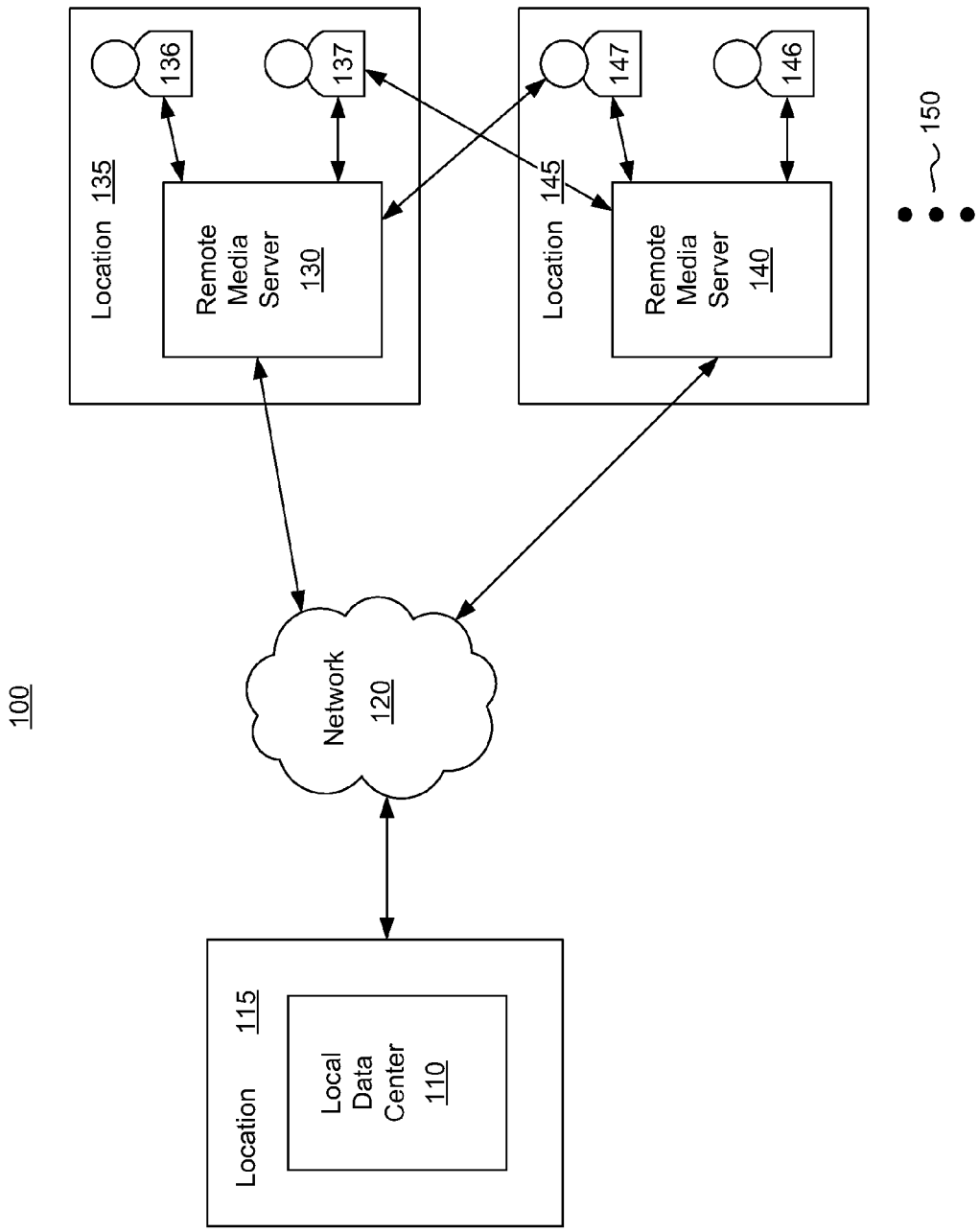
FIG. 1 illustrates a block diagram of contact handling system including a local data center and remote media servers.

Many companies, including telephony carriers, require centralized computer facilities to meet security and cost requirements. When two or more sites are required for redundancy, the sites are often established in the same country for convenience or to minimize regulatory requirements. Often these centralized facilities house resources which need to be accessed globally for business needs, and can be very expensive if they need to be replicated to international locations.

Streaming media is a critical component in most business environments. Streaming media may include voice and voice conferencing and data such as video, video conferencing, etc. Often these streams must be recorded and stored in the data center of the business for regulatory or quality assessment use. In the case of voice media, it is often necessary for the recording to combine all participating parties into a single result. This is often performed by the company data center for secure access to company data storage.

When a media server is deployed to a remote area, it is often done as computer server hardware placed in a hosted or partnered data center. There is often a significant cost for initial purchase and installation of the hardware, as well as a monthly charge for rack space, floor area, power usage, network bandwidth, etc. The challenge is compounded by hardware and software maintenance issues, where $3^{rd}$-party technicians must often be paid to do technical work on the remote media server under the direction of business data center administrators. Not only can the costs be significant, but the duration of time involved can be a significant barrier to company time-to-market goals.

Remotely-deployed media servers that will be accessed by callers from the Public Switch Telephone Network (PSTN) or internet-based telephony protocols such as Session Initiation Protocol (SIP) require security measures to prevent unauthorized access. If the remote media servers require registration or database servers to be deployed with them for account look-up, account validation, call routing or other functionality, costs and complexity again go up.

Many businesses make use of an Interactive Voice Response (IVR) Unit as part of their overall customer care offering. An IVR typically plays music-on-hold and prerecorded voice messages, and accesses business data from the data center to offer information to the customer or offer choices to the caller. Recording functions are also a typical function of an IVR, and may be used to record the caller's name or record a message from the caller. Other services may also be associated with an IVR. A Text-to-Speech (TTS) server may be used to convert an account to speech and played to the caller. Choices offered to the caller may be detected from the caller's vocal input by an Automated Speech Recognition (ASR) server rather than relying on the traditional pressing of digits on the caller's hand-set. In many cases, the caller must eventually be connected to a company representative, which requires telephony routing facilities.

The international expansion of a business or telephony carrier often involves the establishment in the target country of company representatives performing functions such as customer care, sales, or other interactions with customers in the target country. Where necessary, the connection between customer and company representative must often be initiated by first routing the customer to an IVR, and thereafter connecting the caller to a company representative (often referred to as an agent), the call being recorded by a media server, and all this while minimizing the propagation delay (shortest network distance) between callers and company representatives assigned to help them. If each call leg of the conversation is back-hauled to a company data center it will often add significant propagation delays and thus hamper effective interaction. On the other hand, it can be prohibitively expensive to field the ancillary IVR, TTS, ASR, and database servers needed to provide a local solution that provides minimized propagation delays, and at the same time these off-site servers trigger increased regulatory and security requirements, audits and maintenance.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

FIG. 1 illustrates a block diagram of a contact handling system 100 which allows for reduced propagation delay in data communications. The contact handling system 100 includes a local data center 110 and remote media servers 130 and 140. FIG. 1 also illustrates that any additional number of remote media servers 150 (shown by ellipses) may be included in the contact handling system 100. One skilled in the art will appreciate that there may be a different number of remote data centers than that depicted in FIG. 1.

In one embodiment, the local data center 110 is configured to provide IVR functionality to caller via the remote media servers as will be explained in more detail to follow. Accordingly, the local data center may be coupled to the remote media servers 130, 140, and 150 by a network 120. As shown in FIG. 1, the local data center 110 and the remote media servers 130, 140, and 150 may communicate with each other bi-directionally over the network 120. The network 120 may be any network that is compatible with the local data center 110 or the remote media servers 130, 140, and 150. For example, the network 120 can include a telephone network. A telephone network can allow a customer to place a telephone call to or receive a telephone call from the contact handling system 100. For example, the network 120 can include the public switched telephone network (PSTN). The PSTN is the network of the world's public circuit-switched telephone networks, or the networks set-up by telephone companies and governments to provide telephone access to homes and businesses. The PSTN can include analog or digital systems and can include fixed or mobile telephones.

Additionally or alternatively, the network 120 can include a computer network that allows email, chat, or voice over internet protocol (VOIP). VOIP can include a family of transmission technologies for delivery of voice communications over IP networks such as the Internet or other packet-switched networks. The Internet includes a global internetwork formed by logical and physical connections between multiple wide area networks and/or local area networks. Alternately or additionally, the network 120 can include one or more cellular RF networks and/or one or more wired and/or wireless networks such as, but not limited to, 802.xx networks, Bluetooth access points, wireless access points, IP-based networks, satellite networks, or the like. The network 120 may also include servers or other switches that enable one type of network to interface with another type of network. In some embodiments, network 120 may be a private network or virtual private network (VPN).

As shown in FIG. 1, the local data center 110 is located in a location 115. In one embodiment, the location 115 is a first country such as the United States of America. As further illustrated in FIG. 1, the remote media server 130 is located in a remote location 135 while the remote media server 140 is located in a remote location 145. In the claims and in the specification, the terms "local" "remote" are defined from the perspective of the data center 110. This means that a remote media server and the location of the remote media server are remote from the local data center 110. For example, the remote location 135 may be a second country that is not the United States of America, while the remote location 145 may be a third country that is neither the United States of America or the second country.

In one embodiment, the remote location 135 may be located on a different continent than the location 115. For example, the remote location 135 may be the United Kingdom, which is located in Europe, while the location 115 is the Untied States of America, which is located in North America.

In some embodiments, the remote location 145 may also be located on a different continent than the location 115. In further embodiments, the remote locations 135 and 145 may be located on the same continent, such as United Kingdom and France, or they may be located on different continents from each other. It will be appreciated that the remote locations 135 and 145 need not be remote from each other, but only need be remote from the perspective of the location 115 and the location data center 110.

In some embodiments, the remote media servers 130, 140, and 150 may be coupled to one another. In this way, the remote media servers are able to route both voice and data to each other.

The remote data server 130 is also connected to or accessible by a caller 136 and/or an agent 137. The remote data server 140 is connected to or accessible by a caller 146 and/or an agent 147. The callers 136 and 146 represent callers who desire to communicate with the local data center 110 and/or one of the agents 137 or 147.

According, the callers 136 and 146 may initiate voice or data communication with the remote media servers 130 and 140. As will be explained, the media servers are able to route the voice or data communication to the local data center 110, receive IVR data in return, or provide local services as directed. Callers such as 136 and 146 may be subscribers to a VOIP telephony service, and the media servers may route calls between them without interaction with an agent or IVR.

The agents represent a person or service that may be provided to the callers 136 and 146 and that are in the same general geographic location as the callers 136 or 146. For example, the agents 137 or 147 may be a representative of a company that speaks in real time with the caller 136 or 146 and provides information, products, or other services to the callers. In some embodiments, the agent may be in a different country than the caller, such as agent 147 may be in a different country than the caller 136. However, the agent will typically be as geographically close to the caller as possible.

The contact handling system 100 takes advantage of an expectation of delay whenever a caller accesses an IVR system. For example, whenever a caller dials into the IVR system, he or she does not know how long it will take to hear a greeting such as "Please press 1 for Sales and 2 for Customer Service." Rather, the caller only knows that some time period will pass before the greeting begins.

In addition, the caller also expects a delay between when a button on his or her phone is pushed and the next action begins. For example, when the caller presses the 1 button for Sales, he or she expects a delay before hearing a new message with additional options. Likewise, when the caller presses a button to be connected to a live agent, the caller expects a delay until the live agent answers.

Because the caller has an expectation of delay, the caller generally has no way to determine the location of a local data center that includes the IVR functionality or the remote media server. In other words, even if the caller is in a country that is on a different continent than local data center, the caller will be unaware of this fact. That is, introducing some delay into the time from when the caller initiates the call and when the IVR response is received does not degrade the call experience of the caller since the caller is expecting the delay. For example, when a person dials a number, he or she expects a delay prior to hearing ring-back, and a further delay prior to answer. When a person dials a toll-free number (often to an IVR), he or she expects a delay prior to hearing the initial greeting. This delay perhaps may be up to 4 seconds. However, once IVR interaction begins the expected delay between a key press and audible feedback or progress drops to perhaps two seconds. When an IVR is a long distance from a caller, a propagation delay of 300 ms, when added to a delay of 2-4 seconds is a small percentage and imperceptible because the caller does not know what to expect from this particular IVR.

Thus, a local data center 110 that is placed in one country, for example the United States, is still able to provide IVR functionality to callers all around world through the remote media servers. Advantageously, the additional costs of placing data centers that include IVR functionality in more than one or a few countries can be avoided. In addition, the need to comply with regulations in multiple countries is also avoided.

However, when the caller 136 or 146 is communicating with the agent in real-time, perceptible latency is not expected. That is, if there is too much latency or signal propagation delay, then the caller's experience will be degraded as the conversation between the caller the and agent will experience talk-over, where one party of the conversation begins speaking when the other may not have finished. Accordingly, by placing the remote media servers that have the functionality to connect the caller and the agent in a location that is in the same country or in a nearby country as the caller, the real-time call latency or propagation delay can be minimized when compared with contact handling systems that must back-haul the connection between the caller and the agent to a single country. Thus, the caller's experience is not degraded.

In one embodiment, call latency between the caller and the agent of 300 milliseconds (ms) will be the maximum allowable to ensure that the caller and the agent do not experience talk-over from too much propagation delay. Advantageously, keeping the propagation delay at or below 300 ms provides for advantages over conventional contact handling systems. As mentioned, it is very expensive to place data centers in multiple countries as this increases the equipment costs. In addition, since each country typically has its own regulations, placing data centers in multiple countries increases regulatory costs. However, taking advantage of the expected delay allows for a single data center in one country to communicate with remote media servers in multiple different countries without degrading the caller's experience.

Figure 2:
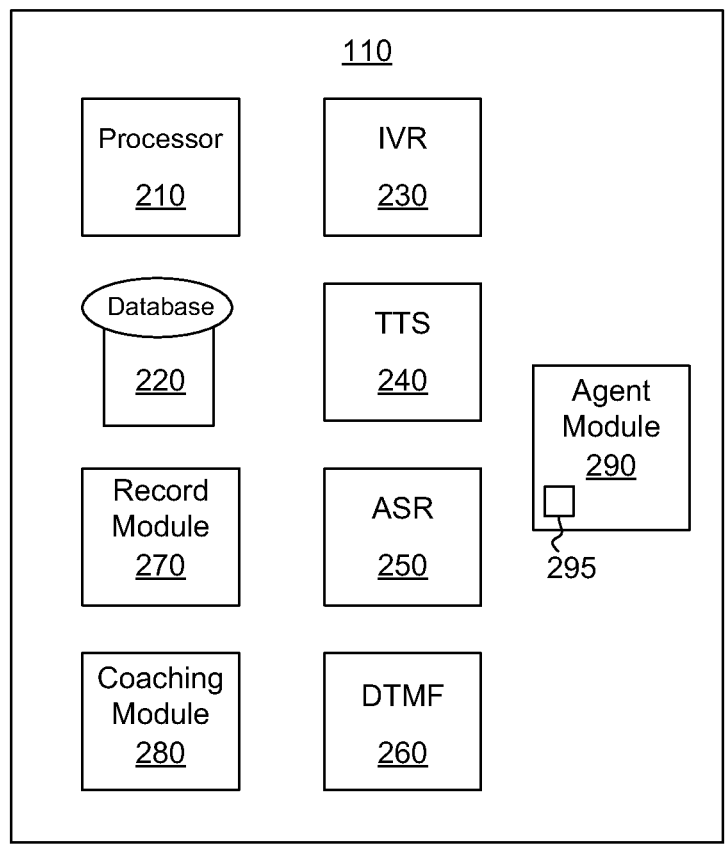
FIG. 2 illustrates an embodiment of the local data center.

FIG. 2 illustrates an example embodiment of the local data center 110. As illustrated, the local data center includes various operational modules and components that allow the local data center 110 to control voice and data communication with one or more remote media servers. Although not necessarily shown as being coupled, so as to not distract from the embodiments disclosed herein, it will be understood that the various operational modules, components, and databases of the local data center 110 may be coupled to each other by any reasonable means such as a computer bus, other wiring, or wireless connection as circumstances warrant. In addition, it will be understood that although the various operational modules, components, and databases of the local data center 110 are shown as being separate, this need not be the case. In some illustrative embodiments, the one or more modules or databases may be included within another module or database.

The local data center 110 includes a processor 210. The processor 210 may be any reasonable processor and in operation allows the local data center 110 to perform various operations. In some embodiments, the processor 210 may be accessed by the various operational modules of the local data center 110 to provide the modules processing resources.

The local data center 110 also includes a database or memory 220. The database 220 may be any type of reasonable non-volatile or volatile memory. The database 220 is able to provide data storage for the other modules and components of local data center 110.

The local data center 110 further includes an Interactive Voice Recognition (IVR) module or component 230. The IVR module 230 provides IVR functionality to incoming voice communications. For example, an incoming voice communication from one of the remote media servers will cause the IVR to activate. The IVR may then provide an IVR message to the caller that will direct them to make a selection. For instance, an IVR message may specify "Please press 1 for Sales, 2 for Customer Service". Depending on which selection the caller makes, the IVR module 230 will then direct the caller to the next message or to an agent for further service.

The IVR module 230 may work in conjunction with a Text to Speech (TTS) module 240. The TTS module 240 is configured to generate a voice representation of text. For example, the TTS module 240 allows a text message to become vocalized and then played to a caller as part of the IVR functionality.

The local data center 110 also includes an Automatic Speech Recognition (ASR) module 250, which may work in conjunction with the IVR module 230. The ASR module 250 is configured to recognize a response that is spoken. For example, a caller may be prompted by an IVR message to make a selection. The caller may then respond with a spoken selection. The ASR module will interpret the spoken selection and provide the response to the IVR module 230 so that the caller may be directed to the next message or to an agent for further service.

The IVR module may also work in conjunction with a Dual Tone Multi-Frequency (DTMF) module 260. The DTMF module 260 is configured to recognize the various dial tones of each button on a standard telephone. In this way, when a caller presses the 1 button on the phone in response to the IVR message, the DTMF module is able to recognize that the 1 button has been selected. The response may then be provided to the IVR module 230 so that the caller may be directed to the next message or to an agent for further service.

The local data center 110 further includes a recording module 270. The recording module 270 is configured to allow for various call legs to be recorded and then stored on disk or in the database 220. As will be explained in more detail to follow, in one embodiment, two call legs may be received from one or two of the remote media servers, one call leg being from the caller and the other from the agent. The recording module may mix the call legs into a single call event and then store the event in the database 220. In another embodiment, the mixing of the two call legs into a single audio stream may occur at the remote media server. The single audio stream may then be streamed to the recording module 270 and then stored on disk or in the database 220.

The local data center 110 may additionally include a coaching module 280. In operation, the coaching module 280 is configured to allow a user, such as a supervisor, to speak instructions to an agent who is talking to a caller without the caller hearing the supervisor. In addition, the coaching module 280 also allows the supervisor to become an active participant in the phone conversation so that caller is able to hear both the agent and the supervisor. In this way, the supervisor is able to directly talk to the caller as circumstances warrant.

In some embodiments, the local data center 110 may further include an agent module 290, which may be an Automatic Call Distributor or an Automatic Contact Distributor (ACD). The agent module may include a listing 295 of agents, such as agents 137 and 147, and their geographic locations. In operation, the agent module 290 may determine, based on an incoming call or data, the location of the caller. The agent module may then use the list 295 to determine the agent closet to the caller and the remote media server that is able to connect the closest agent to the caller. For example, if the caller where in England, the agent module 290 will use the list 295 to determine if there are any available agents in England and if so, which one is closest. If there are no available agents in England, then the agent module 290 would determine where the closest available agent is located, for example in France. Once the location of the closest available agent is determined, the remote media server that can connect the caller to the agent is also determined. This information may be provided to the IVR module 230 so that is can be sent to the remote media server for connection of the caller and the agent.

Figure 3:
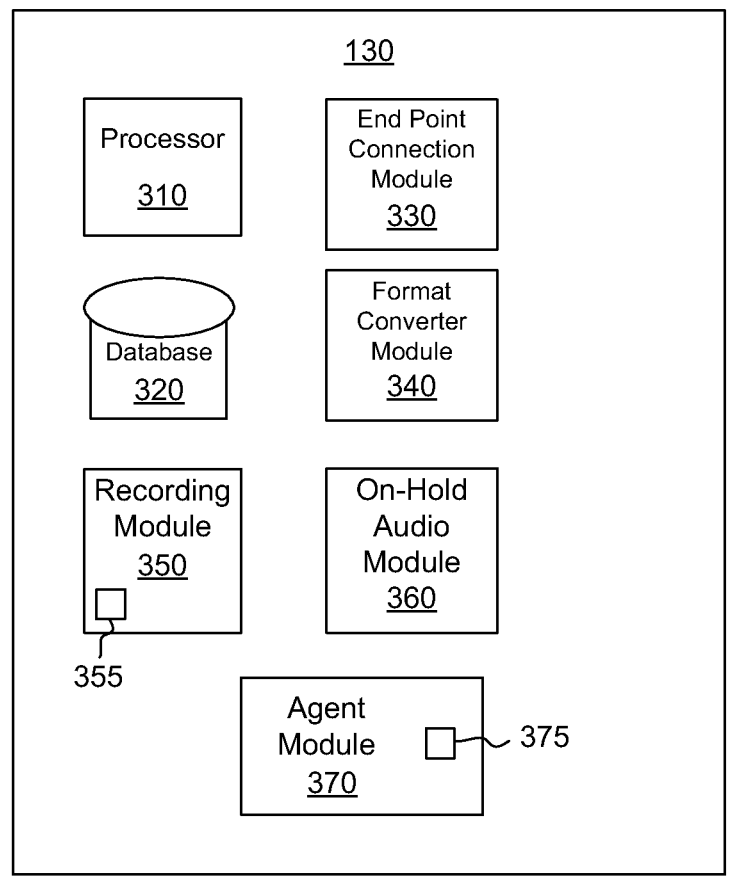
FIG. 3 illustrates an embodiment of a remote media server.

FIG. 3 illustrates an example embodiment of the remote media server 130, and may correspond to any of the remote media servers 140 or 150 of FIG. 1. As illustrated, the remote media server 130 includes various operational modules and components that allow the remote media server 130 to manage endpoint connections between a local data center, another remote media server, a caller, an agent, and/or a supervisor. Although not necessarily shown as being coupled, so as to not distract from the embodiments disclosed herein, it will be understood that the various operational modules, components, and databases of the remote media server 130 may be coupled to each other by any reasonable means such as a computer bus, other wiring, or wireless connection as circumstances warrant. In addition, it will be understood that although the various operational modules, components, and databases of the remote media server 130 are shown as being separate, this need not be the case. In some illustrative embodiments, the one or more modules or databases may be included within another module or database.

The remote media server 130 includes a processor 310. The processor 310 may be any reasonable processor and in operation allows the remote media server 130 to perform various operations. In some embodiments, the processor 310 may be accessed by the various operational modules of the remote media server 130 to provide the modules processing resources.

The remote media server 130 also includes a database or memory 320. The database 320 may be any type of reasonable non-volatile or volatile memory. The database 320 is able to provide data storage for the other modules and components of remote media server 130.

The remote media server 130 further includes an endpoint connection module 330. In operation, the endpoint connection module 330 is configured to determine, based on the incoming communication data, where a particular call leg should be routed. For example, if the destination number specifies that the call should be routed to an IVR, the destination is the local data center 110, and the endpoint connection module 330 will route the call leg to the local data center Likewise, if the endpoint connection module 330 determines that a call leg should be routed to an agent or to another remote media server, the endpoint connection module 330 will route the call leg to the intend party.

As mentioned in connection with FIG. 1, the remote media server 130 is located in a remote location, which is often in a country on another continent than the local data center 110. As such, it may often be the case that the remote media server 130 and the local data center 110 will employ different voice and data standards. Accordingly, the remote media server 130 may include a format converter module 340 that may work in conjunction with the endpoint connection module 330. The format conversion module may be configured to convert an incoming call leg into a format that is acceptable to the receiving endpoint. For example, if the remote media server 130 were located in Europe and the local data center were located in the United States, then the format converter module 340 would convert a call leg from a European audio standard to a United States audio standard prior to routing the call leg to the local data center 110.

The remote media server 130 further includes a recording module 350. The recording module 350 is configured to mix two call legs into a single audio stream and then route the result to the local data center for storage. The IVR 230, recoding module 350, or other modules may include rules or polices 355 that indicate when the single audio stream should be streamed to the local data center 110 for storage. For example, the rules or polices 355 may specify that a single audio stream should be streamed to the local data center 110 immediately after being mixed.

In another embodiment, the single audio stream may be stored in the database 320. The rules or policies 355 may then specify that the single audio stream should be streamed to the local data center 110 whenever the bandwidth is below a designated amount or during off-peak hours such as overnight. In this way, bandwidth is preserved as the recorded result is only streamed during those times where bandwidth is plentiful or less costly.

In some embodiments, the remote media server 130 may include an on-hold audio module 360. The on-hold audio module is configured to include music, recorded instructions, advertising, or other content that may be played to the caller while the caller is on hold. For example, a caller may be put on hold while the endpoint connection module 330 connects with another remote media server or a local agent. During such time, the on-hold audio module 360 may play music to the caller. Advantageously, having the on-hold audio module 360 stored at the remote media server 130 rather than just at the local data center 110 may preserve bandwidth as the content of the on-hold audio module 360 need not be transmitted from the local data center to the remote media server prior to being played to the caller.

In some embodiments, the remote media server 130 may further include an agent module 370. The agent module 370 may include a list 375 of the agents, such as agents 137 and 147, which are closest to the remote media server. In this way, the remote media server is able to connect a caller that is local to the remote media server 130 with the agent that is closes when directed by the local data center 110. In some embodiments, the agent module 370 may work in conjunction with the agent module 290 previously described.

Figure 4:
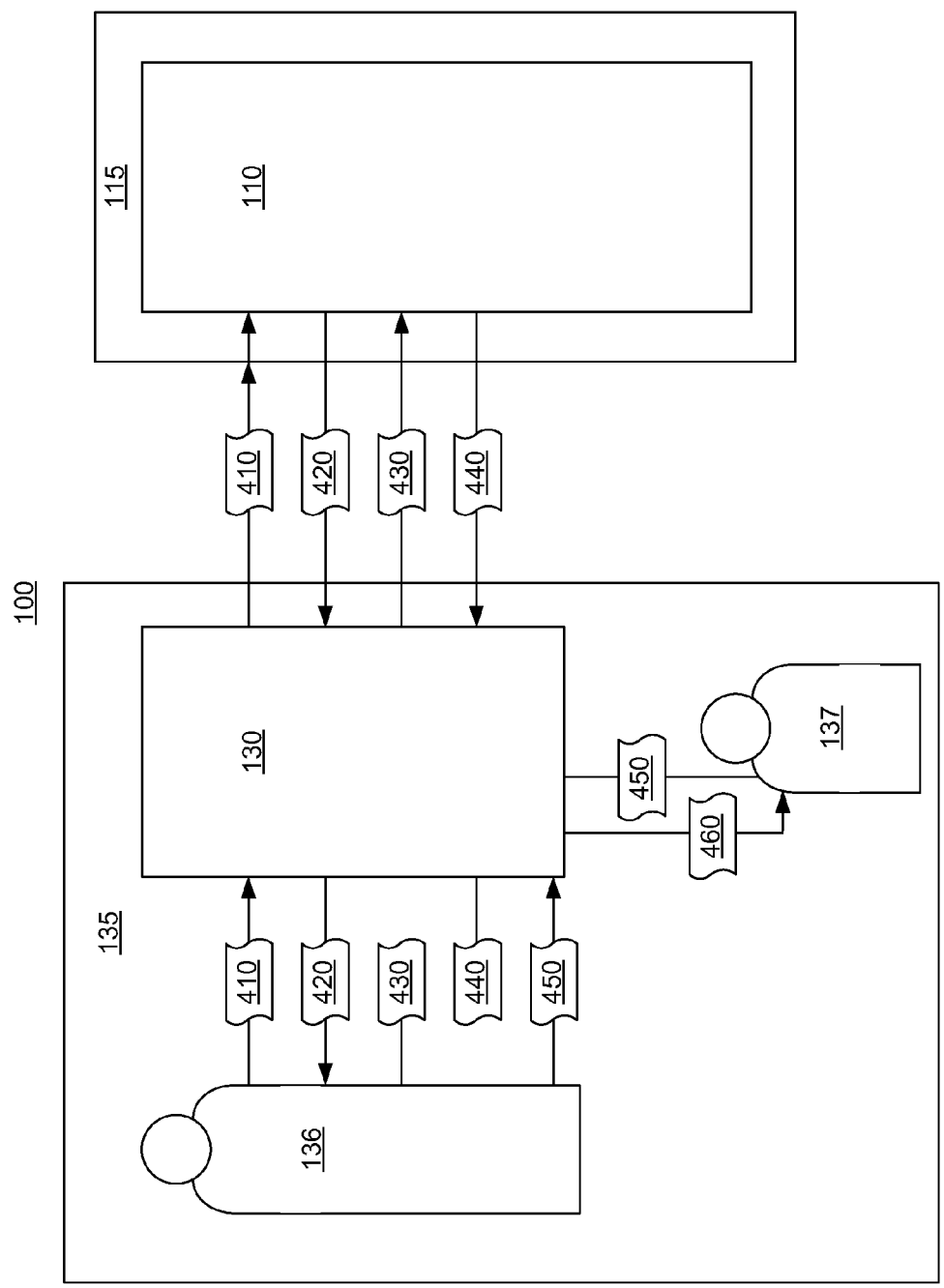
FIG. 4 illustrates the flow of a call into a remote media server which recognizes by the destination number that the call will be back-hauled to the company data center for IVR functionality; an inbound caller that was serviced by an IVR via back-haul is subsequently connected to a remote agent in order to minimize talk path propagation delay.

Having described embodiments of a local data center and a remote media server, attention is now given to describing various aspects of the contact handling system 100. Attention is first given to FIG. 4, which illustrates the flow of a call into a remote data center that will be back-hauled to the local data center. In FIG. 4, the network 120 has been omitted so that the additional features of this figure may be seen more clearly. As illustrated, a caller 136 initiates a call leg 410. The call leg 410 is received by the remote media server 130, specifically the endpoint connection module 330. The end point connection module determines based on the destination number of call leg 410 that the call requires the services of the local data center and therefore is to be back-hauled to the local data center 110. As illustrated, the caller 136 and the remote media server 130 may be in a location 135 that is a country that is on a different continent than the location or country 115 of the local data center 110. For example, the location or country 115 may be England and the location or country 115 may be the United States. As mentioned above, the terms "local" and "remote" are defined from the perspective of the location of the data center 110.

The endpoint connection module 330 then routes the call leg 410 to local data center 110. In some embodiments, the format conversion module 340 may convert the call leg 410 from a format used in the location or country 135 to one used by the location or country 115.

The call leg 410 is then received by the local data center 110, where the IVR module 230 generates or accesses an IVR message 420 to be sent back to the caller 136. As previously described, the other modules of local data center 110 may work in conjunction with the IVR module 230 in interpreting the call 410 and/or generating or accessing the IVR message 420.

The IVR message 420 is then sent to the remote media server 130. If needed, the format conversion module 340 may convert the IVR message 420 to a format that used by the telephone or other system that caller 136 is using. The remote media server 130 may then route the IVR message 420 to the caller 136.

As discussed above, the caller 136 has an expectation of some delay between the time he or she initiates the call 410 and when he or she receives the IVR message 420. This expected delay ensures that the caller 136 is unaware of the distance between the local data center 110 and the caller. Thus, the cost savings and the bandwidth savings previously discussed may be achieved.

The caller 136 may then select an option from the IVR message 420. For example, the IVR message 420 may tell the caller 136 to push the 1 button on his or her phone to contact a live agent. This response (i.e. pushing the 1 button), shown in FIG. 4 as message 430, is then sent to the local data center 110.

Since the caller 136 selected an option that indicated a desire to speak to a live agent, the agent module 290 of the local data center may determine where the nearest available agent is located. As mentioned, it is desirable to connect the caller 136 with an agent in the same country or at least a nearby country to minimize talk path propagation delay. This is especially beneficial if the local data center and the remote media servers are located on different continents as trans-continent communication typically requires a much larger bandwidth than local communication.

Thus, if the caller 136 were in England, then the agent module 290 would try to select an available agent in England. In some embodiments, the agent module 370 of the remote media server is used by the local data center 110 to help determine the nearest agent. In the illustrated embodiment, the agent 137 is the nearest agent and is located in location or country 135.

Once the nearest available agent is selected, the local data center 110 will send notification to the remote media server 130 to connect the caller 136 with the agent 137. This is illustrated as message 440 in FIG. 4. As mentioned previously, the caller 136 also has an expectation of delay between the time he or she selects the option to connect with a live agent and the time that he or she is actually connected.

In some embodiments, there may be a need to delay the connection of the caller 136 and the agent 137 beyond the expected delay. For instance, the agent 137 may be engaged with another caller or may be otherwise unavailable. In such embodiments, the caller 136 may be placed on hold by the local data center 110 or the remote media server 130. While on hold, the on-hold audio module 360 of remote media server may play music or the like to the caller 136 until the agent 137 connects with the caller. Advantageously, the ability to transfer a call back and forth between the local data center 110 and the remote media server 130 can save considerable bandwidth while the caller 136 is on hold and listening to the music.

The remote media server 130 may then connect the caller 136 and the agent 137. The conversation between the caller 136 and the agent 137 is illustrated in FIG. 4 by call legs 450 and 460. As long of the latency or propagation delay of 300 ms or less is maintained, which is achieved by having the remote media server 130, the caller 136, and the agent 137 in the same country or in nearby countries, the caller's experience is not degraded.

In an alternative embodiment, it may be that the nearest available agent is agent 147. In such embodiments, the remote media server 130 may route the message 440 to the remote media server 140. The remote media server 130 and the remote media server 140 may then ensure that caller 136 and agent 147 are connected to one another.

Figure 5A:
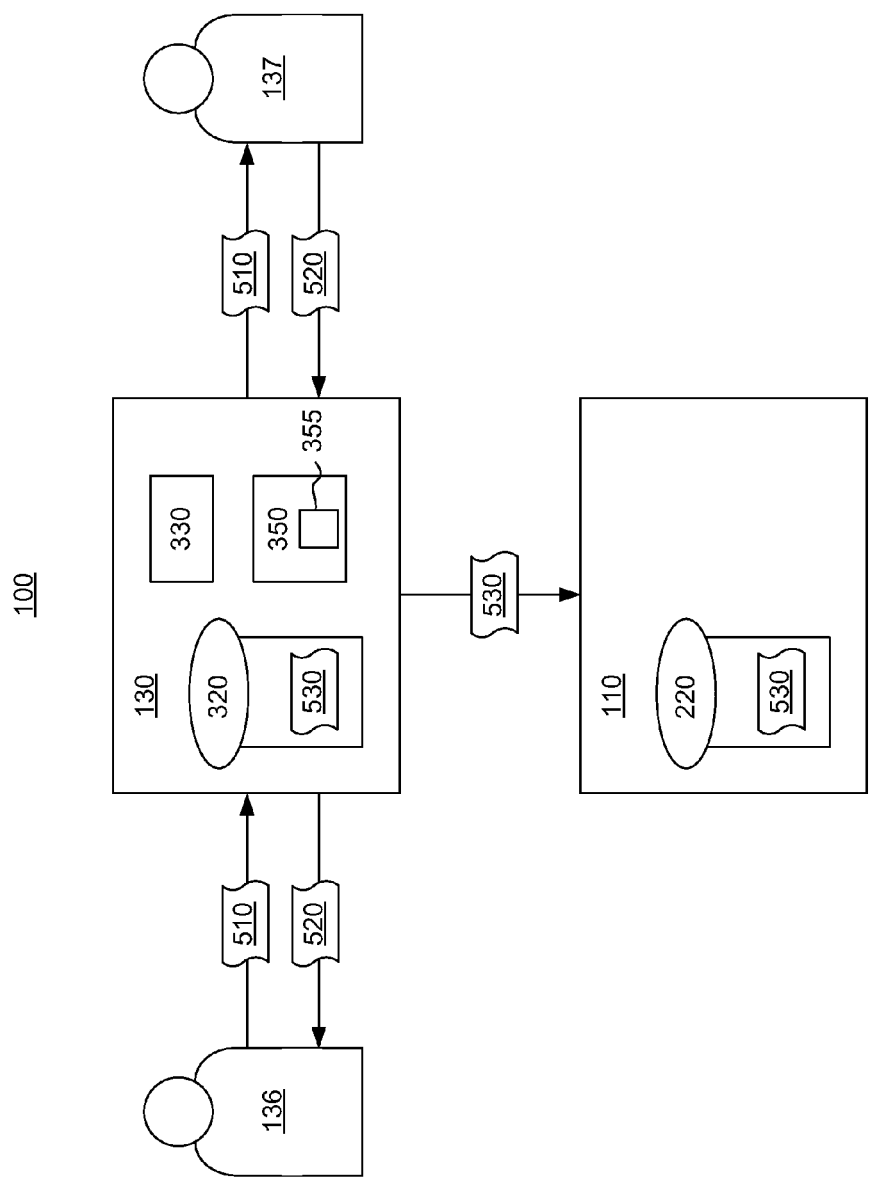
FIGS. 5A illustrates a remote caller connected to a remote agent and that their conversation is being recorded remotely for later transfer to the local data center.
Figure 5B:
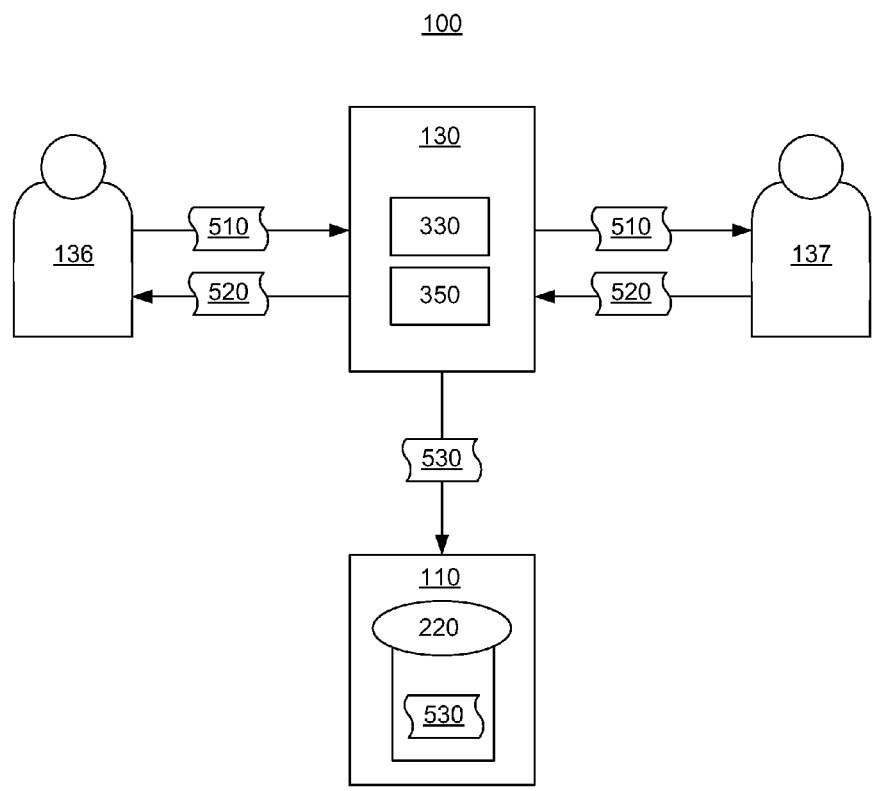
FIG. 5B illustrates that a remote caller connected to a remote agent and that their conversation is being recorded by mixing their conversation remotely and streaming the result to the local data center for storage.
Figure 5C:
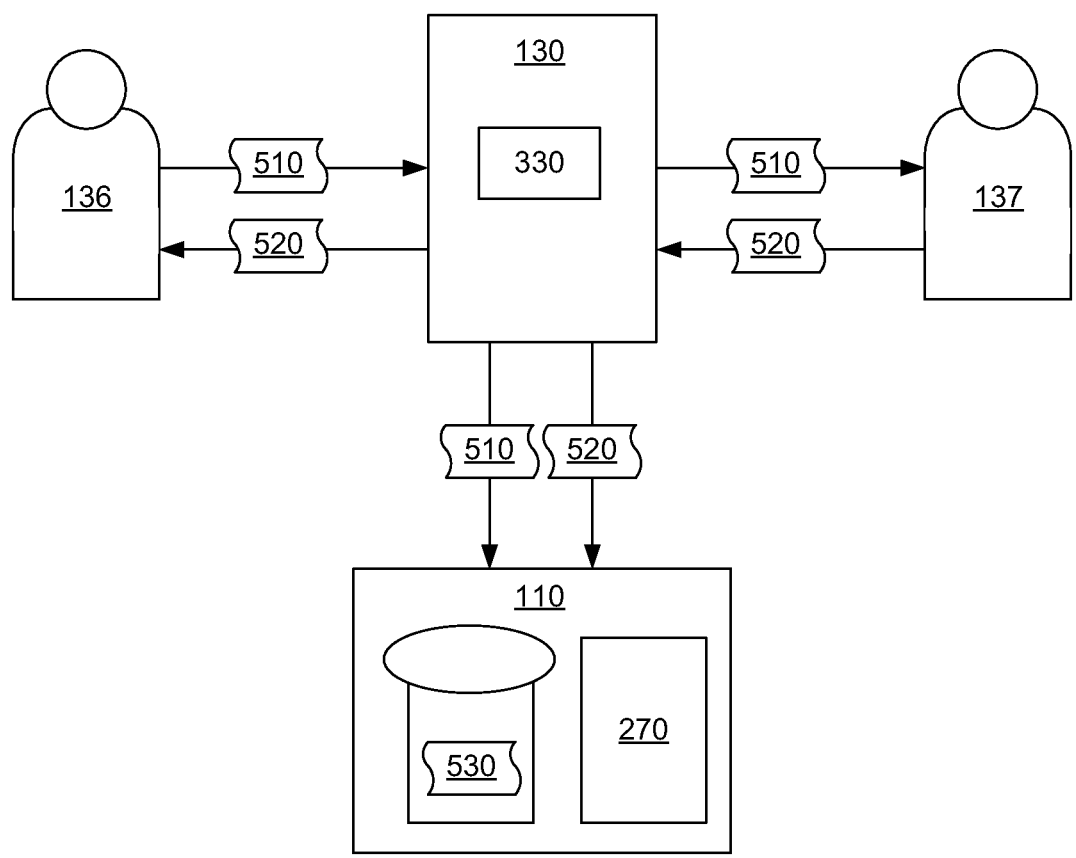
FIG. 5C illustrates that a remote caller is connected to a remote agent and that their conversation is being recorded by streaming both call legs to the local data center for real-time mixing, recording and storage.

Attention is now given to FIGS. 5A-5C, which illustrate call leg recording aspects of the contact handling system 100. In FIG. 5A, the remote media server 130 has connected the caller 136 with the agent 137. This may take place after the actions described in FIG. 4 above, although this is not required.

As shown, the caller 136 provides call leg 510 intended for the agent 137 to the remote media server 130. The call leg 510 may then be provided by the remote media server 130 to the agent 137. The agent 137 provides call leg 520 intended for the caller 136 to the remote media server 130. The call leg 520 may then be provided by the remote media server 130 to the caller 136.

In the embodiment of FIG. 5A, the recording module 350 is able to mix the call legs 510 and 520 into a single audio stream 530. The single audio stream 530 may then be stored in the disk or database 320 for streaming to the local data center 110 at a later period of time. As will be appreciated, recording the call legs 510 and 520 allows for review of the call 530 by a supervisor of the agent 137 for quality control, training, and other uses that may be beneficial to the operators of contact handling system 100.

As mentioned above, the recording module 350 includes rules or policies 355 that specify when the call 530 should be streamed to the local data center 110. For example, in one embodiment, the rules or policies 355 may specify that transmission of the audio 530 take place whenever the bandwidth usage between local data center 110 and remote media server 130 is below a predetermined threshold. In other embodiments, the rules or policies 355 may specify that the transmission of audio 530 take place during the night or some other time period when the bandwidth usage between local data center 110 and remote media server 130 is typically low. As will be appreciated, the rules or polices 355 may specify transmission of the audio 530 in any manner that minimizes bandwidth use.

FIG. 5B illustrates additional call leg recording aspects of contact handling system 100. As with FIG. 5A, the remote media server 130 has connected the caller 136 with the agent 137 so that the caller 136 and the agent may have a conversation. The conversation may include call legs 510 and 520 as previously described.

In the embodiment of FIG. 5B, the recording module 350 is able to mix the call legs 510 and 520 into a single call 530. However, instead of storing the audio 530 for later transmission to the local data center 110, the audio 530 is streamed in real-time to the local data center 110. The call 530 may then be stored in database 220. As can be appreciated, real-time streaming of the audio 530 allows for real-time monitoring, real-time training, and the like.

FIG. 5C illustrates additional call leg recording aspects of contact handling system 100. As with FIG. 5A, the remote media server 130 has connected the caller 136 with the agent 137 so that the caller 136 and the agent may have a conversation. The conversation may include call legs 510 and 520 as previously described.

In the embodiment of FIG. 5C, the recoding module 350 does not record or mix the audio streams 510 and 520. Rather, the audio streams 510 and 520 are streamed in real-time to the local data center 110. Upon receipt of audio streams 510 and 520, the record module 270 may mix the call legs into the single audio 530. The single audio 530 may be stored in the database 220 to allow for monitoring and training as circumstances warrant.

The embodiments of FIGS. 5A-5B allow for flexibility in choosing where to mix and record call legs. As will be appreciated, in some circumstances, it may be desirable to mix and record in the remote media server and this may save bandwidth since live streaming may not occur and separate streams and likewise not required. In addition, if a monitoring supervisor is located in the remote location, then there may be no need to stream the call legs to the local data center. However, in other circumstances it may be desirable to mix and record the call audio at the local data center. For example, it may be that a remote media server does not have the ability to mix or record. In addition, if a monitoring supervisor is located near the local data center, then mixing and recording at the local data center may be desirable for real-time monitoring.

Figure 6:
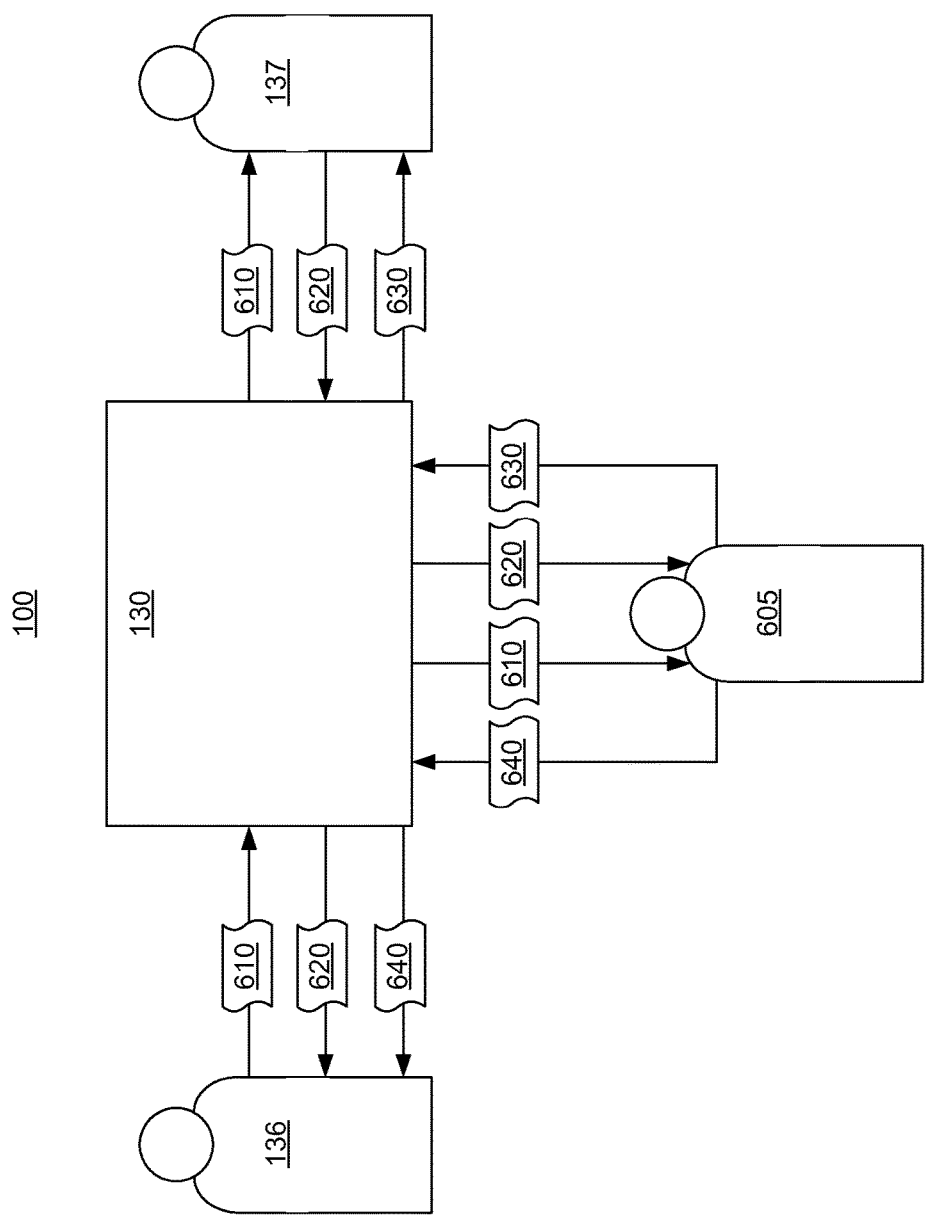
FIG. 6 illustrates a supervisor monitoring a conversation for quality assessment, coaching, or conferencing.

Attention is now given to FIG. 6, which illustrates various monitoring aspects of contact handling system 100. As shown, the caller 136 provides call leg 610 intended for the agent 137 to the remote media server 130. The conversation call leg 610 may then be provided by the remote media server 130 to the agent 137. The agent 137 provides call leg 620 intended for the caller 136 to the remote media server 130. The call leg 610 may then be provided by the remote media server 130 to the caller 136.

As shown in FIG. 6, in addition to being provided to the caller 136 and the agent 137, the call legs 610 and 620 may also be forked by the remote media server 130 so that they are accessible in real-time to a supervisor 605. In this way, the supervisor 605 is able to monitor the conversation. As described above in relation to FIGS. 5, the call legs may also be mixed prior to being monitored by supervisor 605. In some embodiments the supervisor 605 may be a local supervisor who accesses call legs 610 and 620 through the local data center 110. In other embodiments, the supervisor 605 may be a remote supervisor who accesses the call legs 610 and 620 through the remote media server 130 or through another remote media server such as remote media server 140 or 150.

In one embodiment, the supervisor 605 may desire to communicate with the agent 137 while the conversation is occurring without the caller 136 hearing the supervisor. This may be done so that the supervisor 605 can coach or train the agent 137 in real time. This action is known as "coaching". Accordingly, the coaching module 280 may allow the supervisor 605 to provide a coaching message 630 to the agent 137 while the conversation is occurring. The coaching message may include instructions or other training as circumstances warrant. The remote media server may route the coaching message 630 to the agent 137. The coaching module 280 may also determine a priority between coaching message 630 and the conversation call leg 620. Thus, if the agent is only able to hear one message at a time, the coaching module 280 causes the coaching message 630 to override the conversation call leg 620.

In some embodiments, it may be desirable for the supervisor 605 to communicate directly with the caller 136. The coaching module 280 may allow the supervisor 605 provide a message 640 to the caller 136. The remote media server may route the message 640 to the caller 136. The coaching module 280 may also determine a priority between message 640 and the conversation call leg 610. Thus, if the caller is only able to hear one message at a time, the coaching module 280 causes the message 640 to override the conversation call leg 610.

Figure 7:
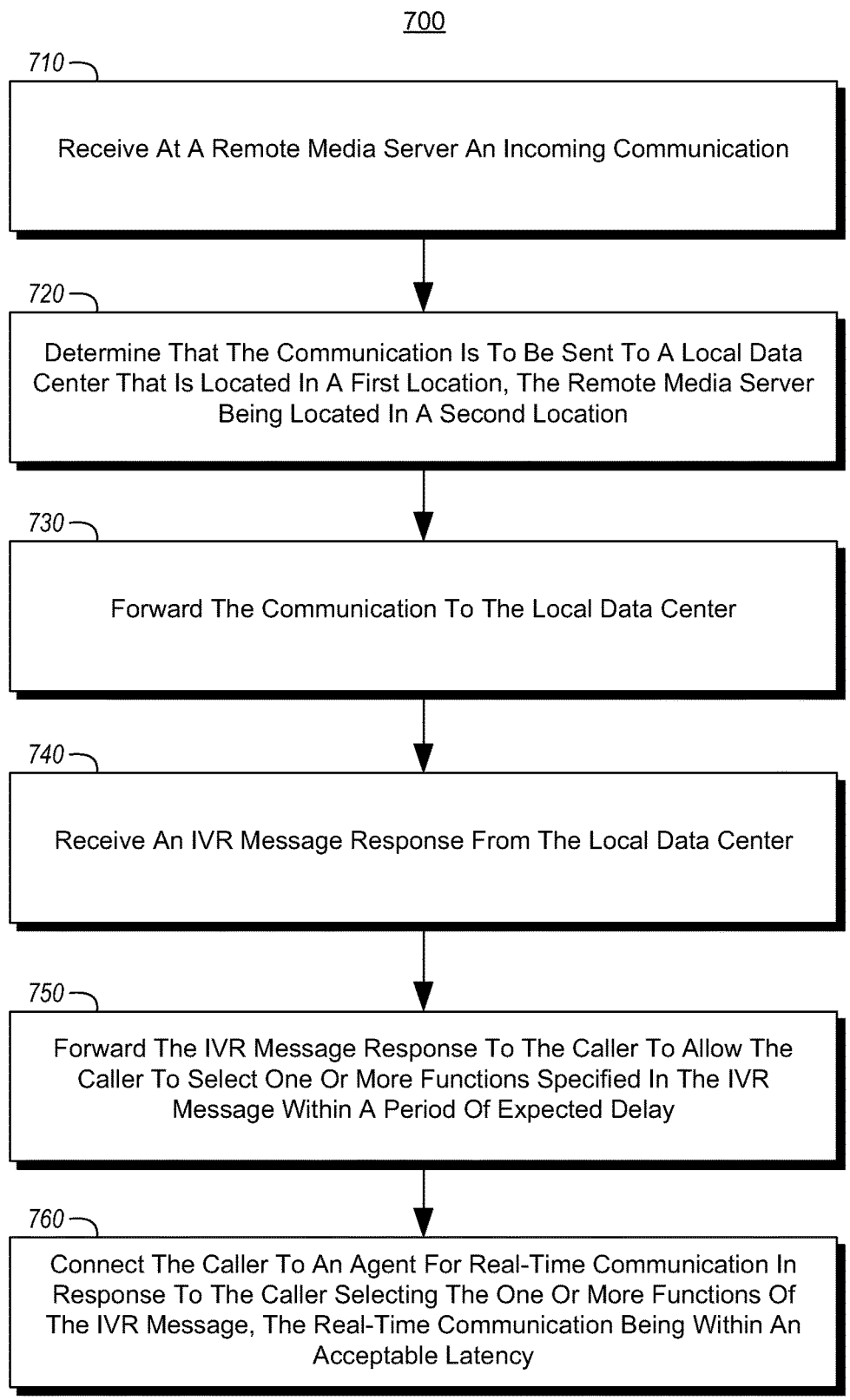
FIG. 7 illustrates a flow diagram of a method for reducing latency between a caller and an agent.

Attention is now made to FIG. 7, which illustrates a flow diagram of a method 700 for reducing latency between a caller and an agent. The method 700 may be performed in a computing system including the local data center 110 and the remote media server 130, 140, or 150 previously described.

The method 700 includes receiving 710 at a remote media server an incoming communication. For example, the remote media server 130 may receive a call or other communication 410 from the caller 136.

The method 700 also includes determining 720, based on the incoming communication, that the communication is to be sent to a local data center and forwarding 730 the communication to the local data center. For example, the local media center 130, specifically the end point connection module 330, may determine from the phone number associated with the call 410 that the call 410 should be sent to the local data center 110. The remote media server may then forward the call 410 to the local data center 110. As previously described, the local data center 110 may be located in a first location or country 115 and the remote media server 130 may be located in a second country or location 135. In some embodiments, the location 135 may be on a different continent than the first location 115.

The method 700 further includes receiving 740 an IVR message response from the local data center and forwarding 750 the IVR message response to the caller to allow the caller to select one or more functions specified in the IVR message. For example, the remote media server 130 may receive the IVR message 420 from the local data center 110. The remote media server may then forward the IVR message 420 to the caller 136.

As previously described, the IVR message 420 is received by the caller 136 within a period of expected delay. That is, the caller 136 expects that some delay will occur between the time the caller 136 initiates the call with the local data center 110 and the time the caller receives the IVR message 420 in response. This expected delay means that the local data center 110 may be located in one country and the remote media server 130 may be located in another country without the caller knowing the distance between the two. This allows for the advantages previously discussed.

The method 700 also includes connecting 760 the caller to an agent for real-time communication in response to the caller selecting the one or more functions of the IVR message. For example, the caller 136 may select an option in the IVR message 420 that indicates a desire to speak with a live agent. This may be sent to the local data center 110, where the agent module 290 may determine that the agent 137 is the nearest agent to the caller 136. As previously described, the nearest agent is typically located in the same location or country as the caller 136 or is located in a location or country that is closer to the caller 136 than the local data center is.

The local data center may then provide message 440 that indicates that the remote media server 130 should connect the caller 136 with the agent 137. The remote media server 130 may then connect the caller 136 and the agent 137, who may communicate using call legs 450 and 460.

As previously described, having the remote media server in the same location or country as the caller 136 or in a location or country that is close to the caller, enables the real-time communication between the caller 136 and the agent 137 to be within an acceptable latency since the caller 136 and the agent 137 are close to each other and to the remote media server 130. In some embodiments, the accepted latency is 300 ms or less.

Figure 8:
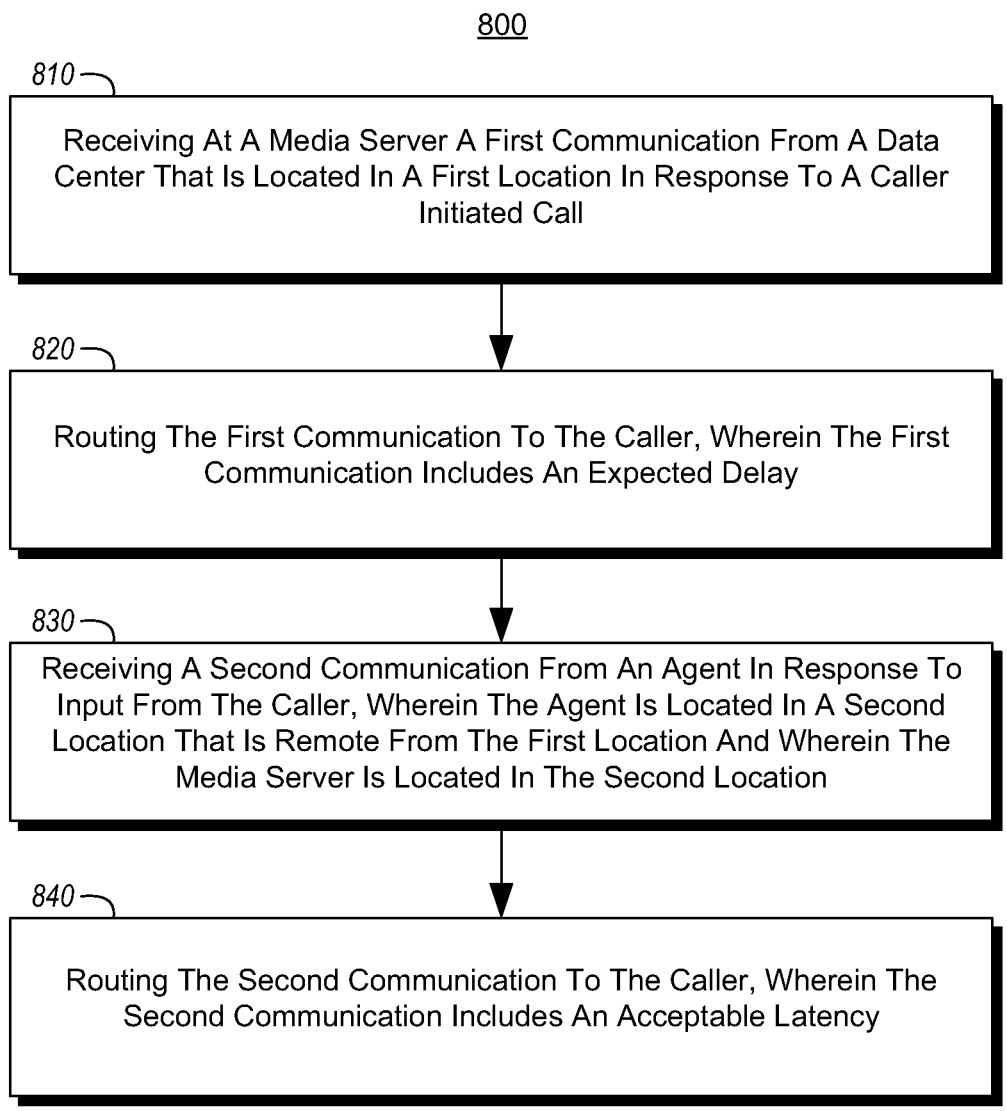
FIG. 8 illustrates a flow diagram of a method for reducing latency in voice traffic between a caller and an agent.

FIG. 8 illustrates a method 800 for reducing latency in voice traffic between a caller and an agent. The method 800 includes receiving 810 at a media server a first communication from a data center that is located in a first location in response to a caller initiated call. For example, the remote media server 130 may receive the IVR message 420 from the local data center 110 in response to the call 410. As previously described, the local data center 110 may be located in a first location or country 115 and the remote media server 130 may be located in a second country or location 135. In some embodiments, the location 135 may be on a different continent than the first location 115.

The method 800 also includes routing 820 the first communication to the caller. For example, the remote media server 130 may route the IVR message 420 to the caller 136. As previously described, the IVR message 420 is received by the caller 136 after a period of expected delay.

The method 800 further includes receiving 830 a second communication from an agent in response to input from the caller. For example, the remote media server 130 may receive the call leg 450 from the agent 137 in response to selecting an option in the IVR message 420 as previously described. As also previously described, the agent 137 and the remote media server may be located in the same location or country as the caller 136, which may be the location or country 135.

The method 800 may additional include routing 840 the second communication to the caller. For example, the remote media server 130 may route the call 450 to the caller 136. As previously described communication between the caller 136 and the agent 137 may be within an acceptable latency since the caller 136 and the agent 137 are close to each other and to the remote media server 130. In some embodiments, the accepted latency is 300 ms or less.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

According to embodiments disclosed herein, the invention can be implemented using cloud computing environments to create a rapidly geographically adaptable model for globally interconnecting businesses and customers. Just as electrical power is generated in any number of locations and delivered by means of a grid, computing resources may be housed at any number of locations and accessed over the internet. In the same way that we don't choose our specific generator, a cloud provider, allows the modules disclosed herein to be rapidly deployed and/or scaled in pre-packaged applications or server images to servers or virtual servers in environments which are described by the cloud provider only in geographically-generic terms such as "North America", "Asia" or "Western Europe". Businesses implementing such cloud computing contact handling systems are allowed to consume as much or as little computing power or storage resources as needed at any given time in an on-demand fashion just as electricity users vary their energy use throughout the day. This pay-as-you-go and use-only-what-you-need system is helpful for businesses who don't want to incur the expenses of installing their own servers when they need fast startup or expansion capacity, special event capacity, or cyclical peak capacity demands. Cloud server resources may be managed by businesses via a browser, a client-side application or an API.

Thus, cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is generally composed of five typical characteristics, three service models, and four deployment models. It will be appreciated that the following lists of characteristics, service models, and deployment models is an example only and is not limiting.

Typical Characteristics:

On-demand self-service. A consumer can unilaterally provision computing capabilities, such as server time and network storage, as needed automatically without requiring human interaction with each service's provider.

Broad network access. Capabilities are available over the network and accessed through standard mechanisms that promote use by heterogeneous thin or thick client platforms (e.g., mobile phones, laptops, and PDAs).

Resource pooling. The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity. Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service. Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models:

Cloud Software as a Service (SaaS). The capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly application hosting environment configurations.

Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models:

Private cloud. The cloud infrastructure is operated solely for an organization. It may be managed by the organization or a third party and may exist on premise or off premise.

Community cloud. The cloud infrastructure is shared by several organizations and supports a specific community that has shared concerns (e.g., mission, security requirements, policy, and compliance considerations). It may be managed by the organizations or a third party and may exist on premise or off premise.

Public cloud. The cloud infrastructure is made available to the general public or a large industry group and is owned by an organization selling cloud services.

Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

In some embodiments, the embodiments disclosed herein may relate to contact handling systems that are implemented as telephony systems. That is, the data centers and media servers disclosed herein may be implemented as a telephony system. Thus, in the specification and in the claims, a contact handling system is considered as an example of a telephony system. It will be appreciated that a telephony system may be other than a contact handling system. A telephony system typically includes a Local Exchange Carrier (LEC) that owns the connections going into a user's home or business. Thus, when the user picks up his or her phone to make a call, the call is first routed to communication infrastructure owned by the LEC, usually in what is called a Central Office. This infrastructure may include the functionality described previously in relation to local data center 110 and/or media server 130. However, it need not include this functionality, but rather may include whatever functionality is needed to connect the user with the party he or she desires to speak with.

If the caller desires to speak with a party that is within the area serviced by the LEC, then the LEC may directly connect the parties. However, if the party is located in an area that is not served by the LEC, then the LEC will typically transfer the call to an Interexchange Carrier (IXC) or Long Distance Carrier. The IXC will include infrastructure that is able to connect the call from the LEC to the third party. That is, the IXC is able to connect the call with the desired third party. This may occur by the IXC directly connecting with the third party or by the IXC transferring the call to a LEC that serves the area of the desired party.

Accordingly, the embodiments disclosed herein are not limited to call handling systems that include IVR functionality. Rather, the data centers and/or media servers may be implemented as LECs and/or IXCs in a telephony system that connects two callers together without the need to backhaul any communication back to data center as described in the embodiments previously discussed.

Figure 10A:
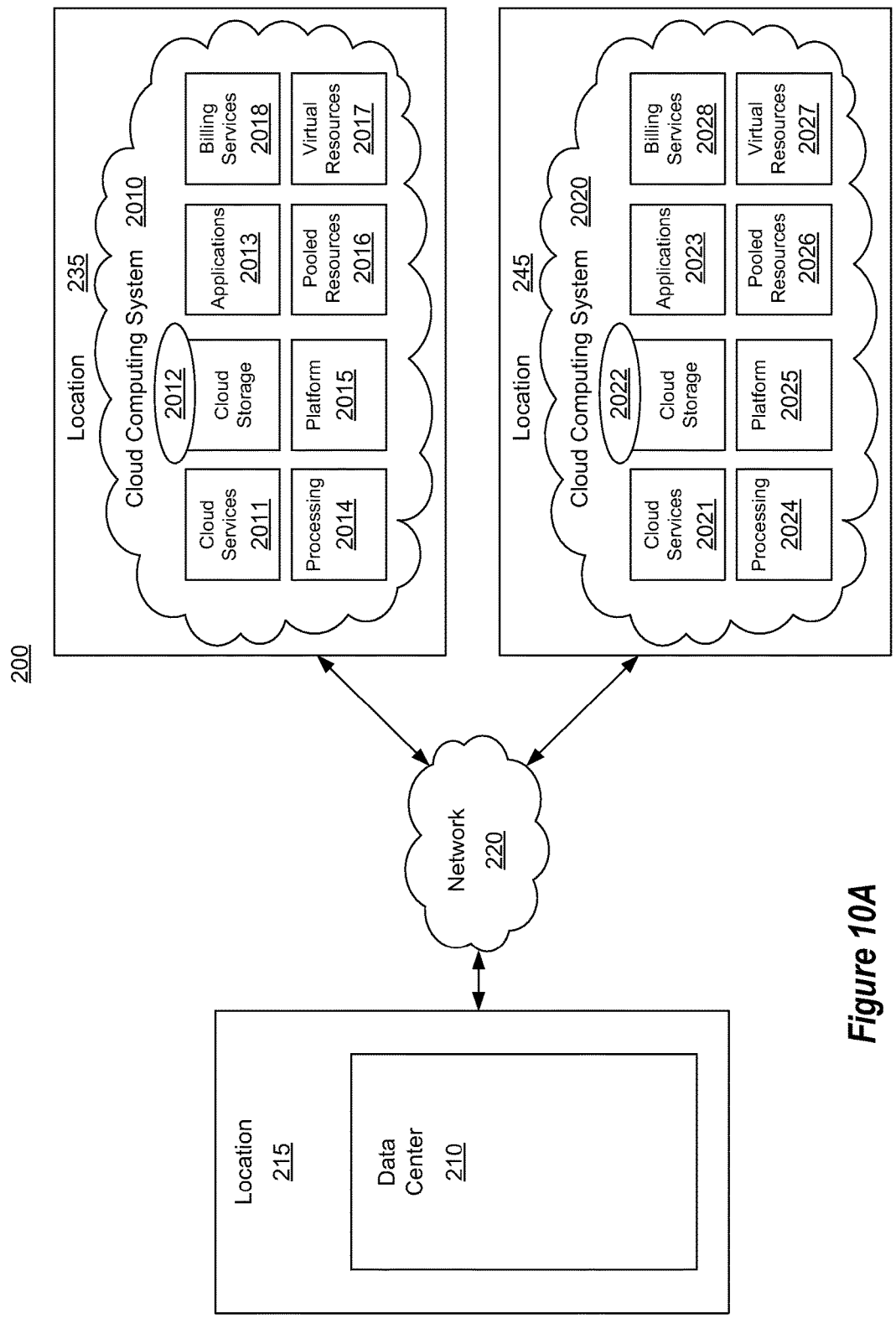
FIG. 10A illustrates an embodiment of a contact handling system including a data center and a cloud computing system.

Attention is now made to FIG. 10A, which illustrates an embodiment of a contact handling system 200. As illustrated, the contact handling system 200 includes a data center 210, which may include the same functionality as the local data center 110 previously discussed in relation to FIG. 2. However, the data center 210 need not include all of the functionality of the local data center 210. For example, in those embodiments dealing with telephony systems, the data center 210 may not include IVR functionality and may simply server as network operating center (NOC) that provisions a cloud computing system for resources as will be explained in more detail to follow. The data center 210 may be located in a location 215. In the present embodiment, the data center 210 is connected to a cloud computing system 2010 that is located in a location 235 and to a cloud computing system 2020 that is located in a location 245 over a network 220, which may correspond to the network 120 previously discussed. In some embodiments the network 220 may be a virtual private network (VPN) that is used to connect the various elements of the contact handling system 200.

In some embodiments, the locations 235 and 245 may be located in countries that are different than the country that the location 215 is located in much the same way that locations 135 and 145 are remote from location 115 previously described. However, in other embodiments, the location 235 and/or 245 may be located in the same country as the location 215 and in fact may be in the same physical location as the location 215 or in close proximity to the location 215. In still other embodiments, one of the locations 235 or 245 may be in the same country as the location 215 while the other of the locations 235 and 245 may be in a different country than the location 215. Thus, in the embodiments disclosed herein relating to contact handling system 200, locations 235 and 245 need not be remote from the location 215. That is, the locations 235 and/or 245 may be the same as the location 215 in some embodiments Likewise, any media servers implemented in the locations 235 and/or 245 need not be remote from the data center 210 in those embodiments where the locations 235 and/or 245 are the same as the location 215. Of course, the embodiments disclosed herein contemplate having the media servers be remote from the data center as circumstances warrant.

As shown, the cloud computing system 2010 includes various cloud computing resources, including cloud services 2011, cloud storage 2012, cloud applications 2013, cloud processing resources 2014, cloud platforms 2015, cloud pooled resources 2016, cloud virtual resources 2017 and cloud billing services 2018. It will be appreciated that the cloud computing system 2010 may include additional computing resources as circumstances warrant. The various computing resources of the cloud computing system 2010 allow the cloud computing system to implement various computing operations as needed. The cloud computing system 2010 is typically owned and operated by a third party cloud computing system provider who provides the various cloud computing resources 2011-2018 to other parties for a usage fee or the like as previously described.

Similarly, the cloud computing system 2020 includes various cloud computing resources including cloud services 2021, cloud storage 2022, cloud applications 2023, cloud processing resources 2024, cloud platforms 2025, cloud pooled resources 2026, cloud virtual resources 2027, and cloud billing services 2028. It will be appreciated that the cloud computing system 2020 may include additional computing resources as circumstances warrant. The various computing resources of the cloud computing system 2020 allow the cloud computing system to implement various computing operations as needed. The cloud computing system 2020 is typically owned and operated by a third party cloud computing system provider who provides the various cloud computing resources 2021-2028 to other parties for a usage fee or the like as previously described. The cloud computing system 2020 may be owned by the same entity as the cloud computing system 2010 or it may be owned by a different entity.

As mentioned, the cloud computing systems 2010 and 2020 provide cloud computing resources to other parties for a usage fee or the like. In some embodiments, the other parties who desire to make use of the cloud computing resources are able to provision such resources unilaterally without requiring interaction with the cloud computing system 2010 or 2020 providers. In other words, an entity such as the owner of the data center 210 is able to access the cloud computing systems 2010 and/or 2020 over the network 220 and provision any required resources without input from the cloud computing system 2010 or 2020 providers. In addition, additional users may also provision required resources at the same time as the owner of the data center 210. The resources may be dynamically assigned and reassigned among the various users of the cloud computing systems 2010 and 2020 as circumstances warrant. It should be noted, that as used herein to "provision" resources from a cloud computing system means to access the resources of the cloud computing system and to provide whatever information is needed to the cloud computing system that will cause the cloud computing system to function in a desired manner.

In one embodiment, the entity that owns the data center 210 may desire to implement one or more media servers in the locations 235 and/or 245 for all of the advantageous reasons previously discussed in relation to the local data center 110 and the remote media server 130. However, the entity that owns the data center 210 may want to first determine the demand for the media server before incurring the costs necessary to install a media server 2300. Advantageously, the embodiments disclosed herein provide for provisioning the resources of a cloud computing system to function as a media server 2300 as needed.

Figure 10B:
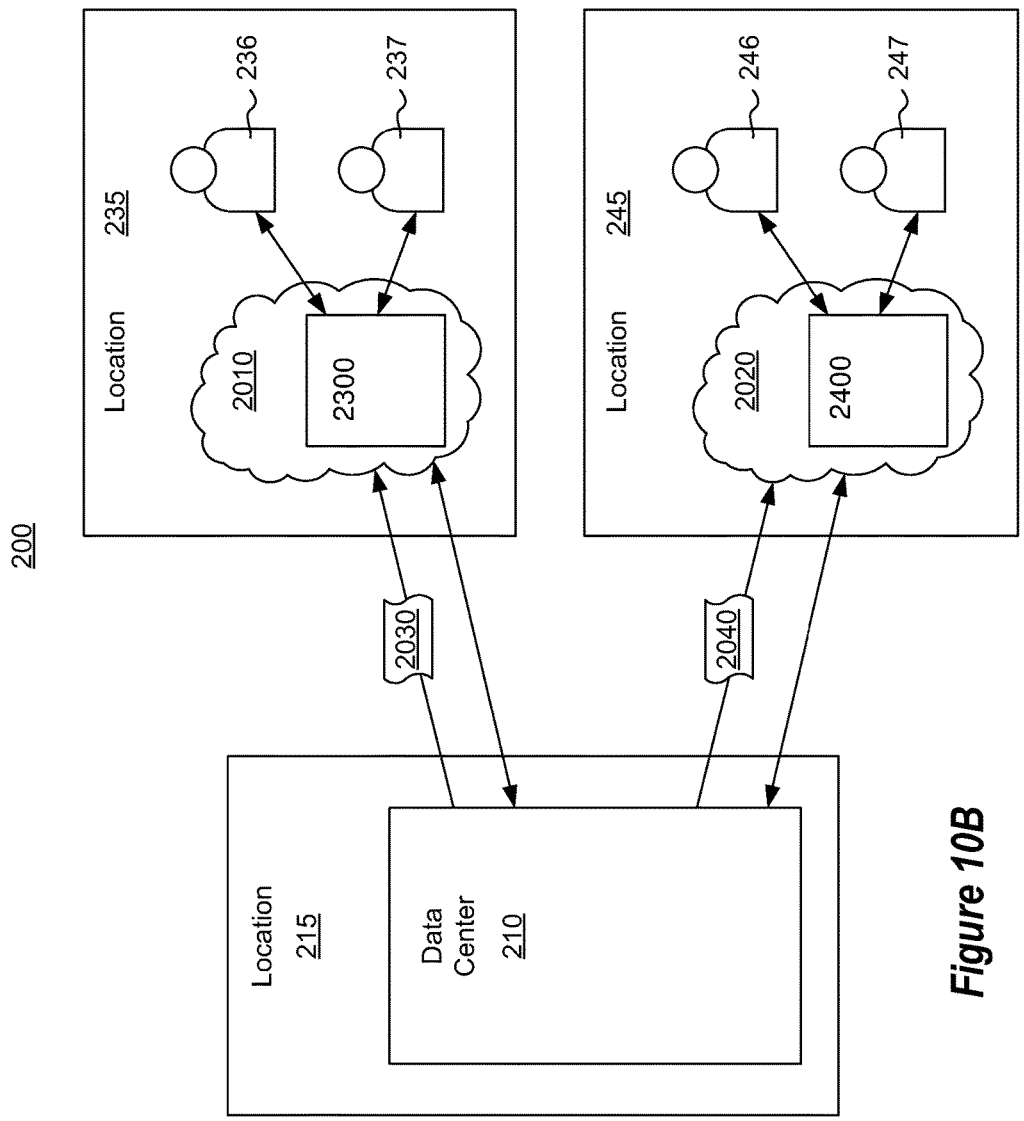
FIG. 10B illustrates the data center provisioning the cloud computing system to implement a media server.

Attention is now given to FIG. 10B, which illustrates provisioning a cloud computing system to function as a media server. As illustrated, the data center 210 provides information 2030 to the cloud computing system 2010. The information 2030 includes any data, interaction, or other input that the data center 210 needs to provide to the cloud computing system 2010 that will allow the data center 210 to provision the cloud computing system to function as a media server. As shown, the receipt of the information 2030 causes a media server 2300 to be implemented using the infrastructure and the resources of the cloud computing system 2010. The media server 2300 may include all the functionality described above in relation to FIG. 3. In some embodiments the media server 2300 will function as part of a telephony system and will function as an IXC or perhaps a LEC. In those embodiments, the end point connection module 330 will be particularly important as it will be used to connect two parties.

In one embodiment, once the media server 2300 is operating in the cloud computing system 2010, the media sever 2300 may receive an incoming call from a caller 236, which may correspond to the caller 136 previously discussed, and may then send the incoming call to the data center 210. The data center 210 may then receive the incoming call and in response, transmit an IVR message to the media sever 2300. The media server 2300 may then provide the IVR message to the caller 236 and may connect the caller 236 to an agent 237, which may correspond to the agent 137, in like manner to that previously explained in relation to contact handling system 100. It will be appreciated that in some embodiments having both the media server 2300 and the cloud computing system 2010 that hosts the media server 2300 located in the same location, in this case location 235, enables the real-time communication between the caller 236 and the agent 237 to be within an acceptable latency as previously explained in relation to contact handling system 100.

In another embodiment, such as when the media server is implemented to function as an IXC or perhaps a LEC, there is no need to transmit the incoming call to the data center 210 as there will typically be no need for IVR functionality. In this embodiment, the media server 2300 that has been implemented in the cloud computing system will use end point connection module 330 and other functionality to route the incoming call from the caller 236 to the agent 237 or to another party or caller that is represented by the agent 237. Thus, the reference 237 (and 237A and 247) may be used to refer to an agent or the references may be used to refer to any other third party or third party caller. Accordingly, the media server 2300 may connect two parties during a phone call or other similar communication.

As also illustrated in FIG. 10B, the owner of the data center 210 may desire to provision a media server in the location 245, which may be located in a different country from the location 215 and 235 and may be on a different continent from the location 215 and location 235 as previously described. Of course, the location 245 may be in the same country or in close proximity to the location 215 and/or 235. Accordingly, the data center 210 provides information 2040 to the cloud computing system 2020. The information 2040 includes any data, interaction, or other input that the data center 210 needs to provide to the cloud computing system 2020 that will allow the data center 210 to provision the cloud computing system to function as a media server. As shown, the receipt of the information 2040 causes a media server 240 to be implemented using the infrastructure and the resources of the cloud computing system 2020.

The media server 2400 may include all the functionality described above in relation to FIG. 3 and may connect a caller 246 and an agent 247, which may correspond to the caller 146 and agent 147 respectively, in like manner as previously described in relation to those embodiments already disclosed herein. It will be appreciated that in some embodiments having both the media server 2400 and the cloud computing system 2020 that hosts the media server 2400 located in the same location, in this case location 245, enables the real-time communication between the caller 246 and the agent 247 to be within an acceptable latency as previously explained in relation to contact handling system 100. It will also be appreciated that like the media server 2300, the media server 2400 may be implemented as an IXC or LEC in a telephony system and thus need not backhaul communication to the data center 210. Rather, the media server 2400 may connect the caller 246 to the agent or other user 247 as needed.

Figure 10C:
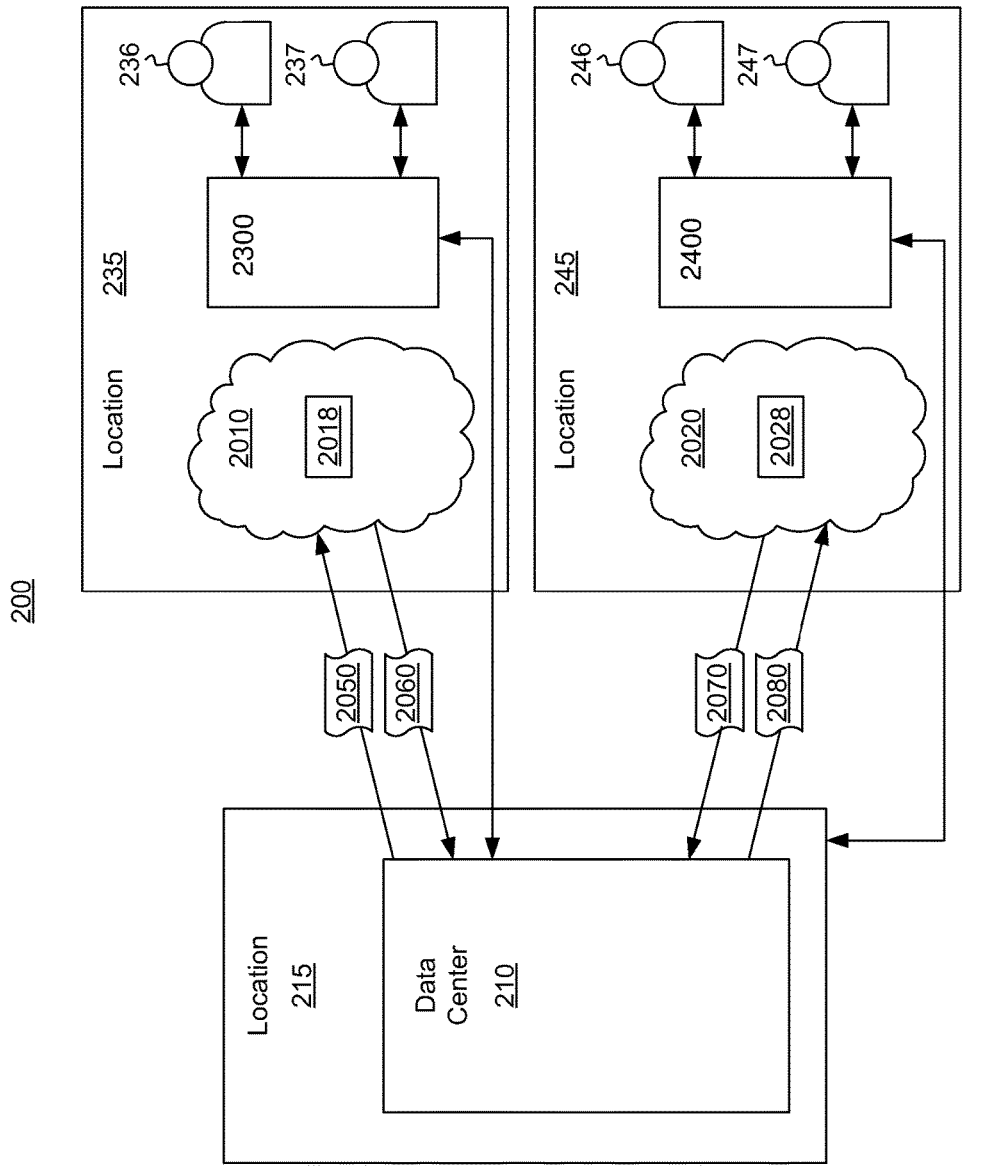
FIG. 10C illustrates discontinuing use of the cloud computing system and implementing the media server outside of the cloud computing system.

After using the cloud computing system 2010 to host the media server 2300 and using the cloud computing system 2020 to host the media server 2400, the owner of the data center 210 may determine that the level of use of the cloud computing systems warrants the installation of permanent media severs 2300 and 2400 in the locations 235 and 245 respectively. It should be noted that "permanent" is meant to imply implementing computing infrastructure that is not part of a cloud computing system in the location 235 or 245. As illustrated in FIG. 10C, the media servers 2300 and 2400 have been implemented permanently in the locations 235 and 245 without using the cloud computing systems 2010 and 2020 respectively. Once implemented permanently, the data server 2300 may allow the caller 236 and the agent 237 to communicate and the data server 2400 may allow the caller 246 and the agent 247 to communicate in any manner previously described herein.

As further illustrated in FIG. 10C, once the media server 2300 has been permanently implemented in the location 235, the owner of the data center 210 may discontinue the use of the cloud computing system 2010. Accordingly, the data center 210 may provide information 2050 to the cloud computing system 2010 that causes the cloud computing system to discontinue implementing the media server 2300. The information 2050 includes any data, interaction, or other input that the data center 210 needs to supply to no longer provision the cloud computing system 2010 to implement the server media 2300.

Once the data center 210 is no longer using the cloud computing system 2010, the cloud computing system 2010 may send an invoice 2060 to the owner of the data center 210. The invoice 2060 may include a fee based on the level of use of the resources of the cloud computing system 2010 that were used to provision the media server 2300. In this way, the owner of the data center 210 may purchase the services of the cloud computing system 2010 when needed and may then implement a permanent media server 2300 when levels of use justify such implementation.

In similar manner, once the media server 2400 has been permanently implemented in the location 245, the owner of the data center 210 may discontinue the use of the cloud computing system 2020. Accordingly, the data center 210 may provide information 2070 to the cloud computing system 2020 that causes the cloud computing system 2020 to discontinue implementing the media server 2400. The information 2070 includes any data, interaction, or other input that the data center 210 needs to supply to no longer provision the cloud computing system 2020 to implement the media server 2400. Once the data center 210 is no longer using the cloud computing system 2020, the cloud computing system 2020 may send an invoice 2080 to the owner of the data center 210. The invoice 2080 may include a fee based on the level of use of the resources of the cloud computing system 2020 that were used to provision the media server 2400.

Figure 11:
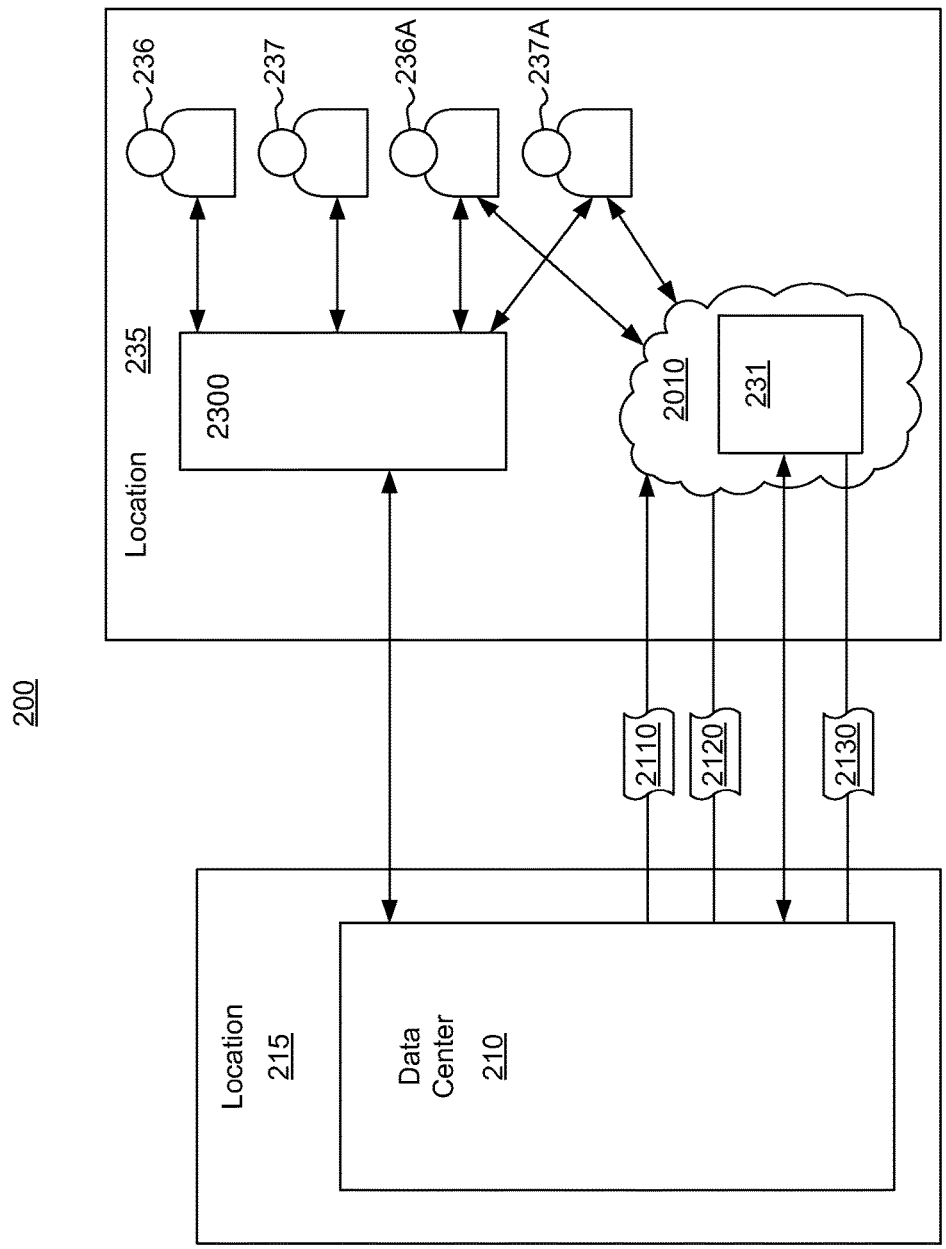
FIG. 11 illustrates provisioning a cloud computing system to implement a media server in response to increased demand on an existing media server.

In some embodiments, a media server 2300 (or 2400) may be implemented in the location 235 as shown in FIG. 11. As described previously, the remote server 2300 may be used to connect the caller 236 with the agent 237 with or without first backhauling any communication to the data center 210. However, there may be an increase in the demand for the services of the media server 2300. That is, additional callers illustrated at 236A in FIG. 11 may contact the media server to be connected to additional agents illustrated at 237A with or without first backhauling any communication to the data center 210. This may lead to the need for additional media servers in location 235, which as previously described may be in the same location or country as the location 215 or may be in a different country or in a different continent as than the location 215.

Advantageously, the embodiments disclosed herein allow for the owner of the data center 210 or the media server 2300 to provision one or more additional media servers using the cloud computing service 2010 when increased demand requires additional media servers. As shown, the data center 210 may determine that the increased demand on the media server 2300 causes the need for additional media servers. In response, the data center 210 may provide information 2110 to the cloud computing system 2010. The information 2110 includes any data, interaction, or other input that the data center 210 needs to provide to the cloud computing system 2010 that will allow the data center 210 to provision the cloud computing system 2010 to function as a media server. In some embodiments, the media server 2300 may make the determination that additional media servers are needed and may then provide the information 2110 to the cloud computing system to cause the provisioning of the additional media servers.

As shown, the receipt of the information 2110, which may be an image, causes a media server 231 to be implemented using the infrastructure and the resources of the cloud computing system 2010. The media server 231 may include all the functionality described above in relation to FIG. 3 and may connect the caller 236A and the agent 237A as previously described in relation to those embodiments already disclosed herein. As is shown, the media server 231 operates in conjunction with the media server 2300. As will be appreciated, in some embodiments, communication will be backhauled to the data center 210 when IVR functionality and the like is needed. However, in those embodiments where the media servers 2300 and 231 operate in as an IXC in a telephony system, there will be no need to backhaul communication to the data center 210 for IVR functionality.

When the demand drops to a level that may be handled by the media server 2300 alone, the data center 210 or the media server 2300 may provide information 2120 to the cloud computing system 2010 that causes the cloud computing system 2010 to discontinue provisioning the media server 231. The information 2120 includes any data, interaction, or other input that the data center 210 needs to supply to no longer provision the cloud computing system 2010 to implement the media server 231. Once the data center 210 is no longer using the cloud computing system 2010, the cloud computing system 2010 may send an invoice 2130 to the owner of the data center 210 or the media server 2300. The invoice 2130 may include a fee based on the level of use of the resources of the cloud computing system 2010 that were used to provision the media server 231.

At a later time, if the data center 210 or the media server 2300 determines that the demand on the media server 2300 is again too great, the data center 210 or the media server 2300 may provision the cloud computing system 2010 to again implement the media server 231. If the demand on the media sever 2300 requires the constant provisioning of the cloud computing system 2010, the owner of the data center 210 or the media server 2300 may permanently implement the media server 231 in the location 235 and may discontinue use of the resources of the cloud computing system 2010 as previously described. It will be appreciated that additional media servers 2400 may also be provisioned in the cloud computing system 2020 when demand in location 245 warrants additional media servers.

Accordingly, when implemented with the teachings herein, cloud computing implemented media servers can be introduced in geographically diverse locations that are either local (e.g., in close proximity to, in the same country or in the same physical location) to the data center 210 or that are remote from the data center 210 and, if later deemed desirable, a permanently hosted media server can be installed. Thus, the cloud computing environment allows for media server introduction with data center control in a rapidly introduced and flexibly scalable environment.

Figure 12:
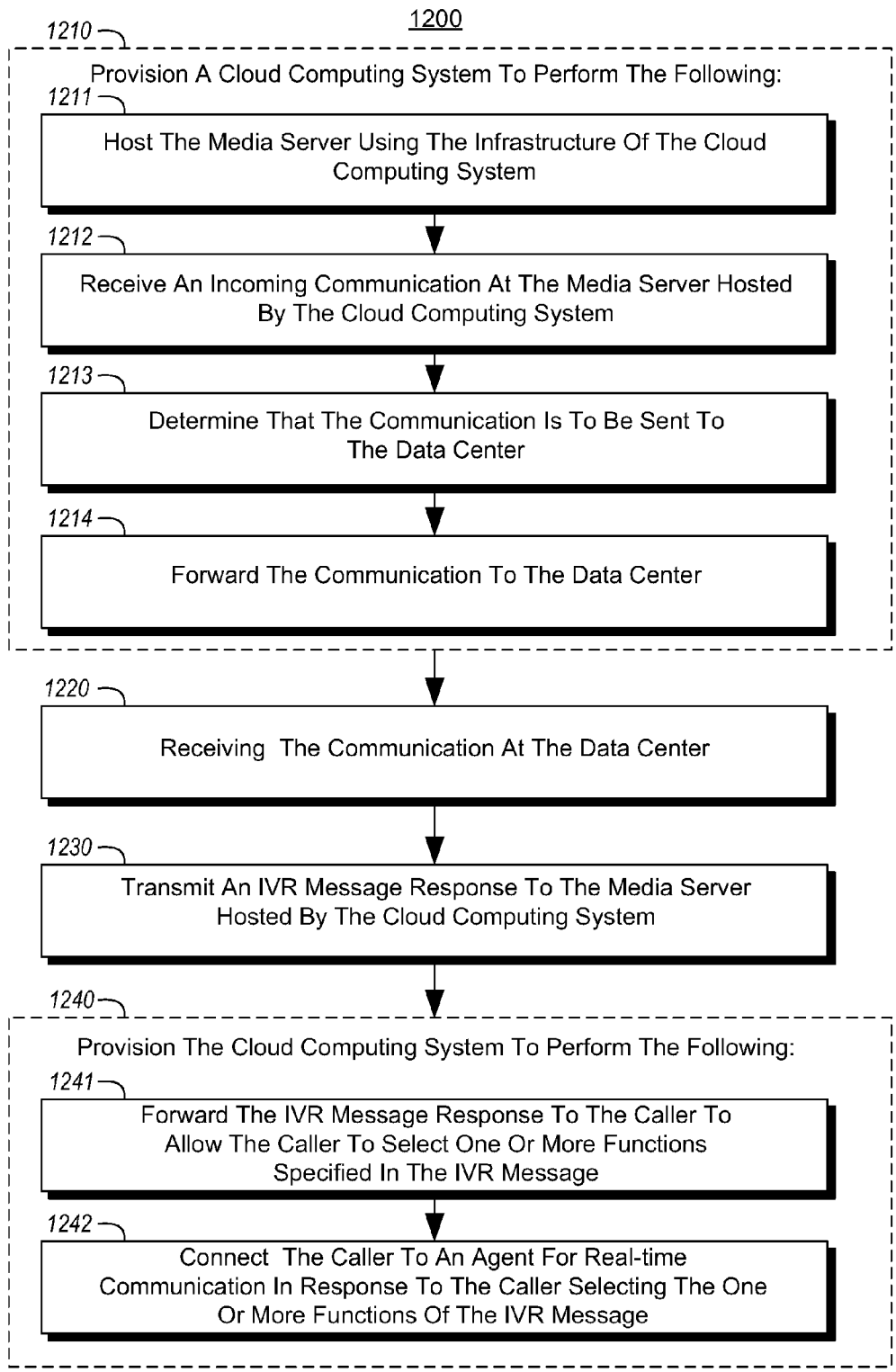
FIG. 12 illustrates a flow chart of method for provisioning a cloud computing system to implement a media server.

FIG. 12 illustrates a flowchart of a method 1200 for provisioning a cloud computing system to implement a media server. The method 1200 includes provisioning 1210 a cloud computing environment to perform the following: host 1211 the media server using the infrastructure of the cloud computing system. For example, the data center 210 may provide information 2030 to the cloud computing system 2010. The information 2030 may provision the cloud computing system 2010 to implement the media server 2300.

Provisioning 1210 also includes receive 1212 an incoming communication at the media server hosted by the cloud computing system. For example, the media sever 230 that is hosted by the cloud computing system 2010 may receive an incoming call from the caller 236.

Provisioning 1210 also includes determine 1213, based on the incoming communication, that the communication is to be sent to the data center. The media server is hosted by the cloud computing environment with cloud computing infrastructure. For example, the media sever 230 that is hosted by the cloud computing system 2010 may determine, based on the call received from the caller 236 that the incoming call should be sent to the data center 210. As described above, the media sever 2300 is hosted by the cloud computing system 2010 that is located in the location 335. In some embodiments, the locations 215 and 235 are different countries that may be on different continents and in other embodiments, the locations 215 and 235 may be located in the same country, on the same continent, or in the same location. That is, the location 235 may be remote from or in close proximity to the location 215.

Provisioning 1210 also includes forward 1214 the communication to the data center. For example, the media sever 2300 that is hosted by the cloud computing system 2010 may forward the incoming call from the caller 236 to the data center 210.

Method 1200 also includes receiving 1220 the communication at the data center. For example, the call from the caller 236 may be received by the data center 210 as previously described.

Method 1200 further includes transmit 1230 an IVR message response to the media server hosted by the cloud computing system. For example, the data center 210 may transmit an IVR message to the media sever 2300 that is hosted by the cloud computing system 2010.

Method 1200 also includes provisioning 1240 the cloud computing environment to perform the following: forward 1241 the IVR message response to the caller to allow the caller to select one or more functions specified in the IVR message. For example, the media sever 2300 that is hosted by the cloud computing system 2010 may forward the IVR message to the caller 236 so that the caller 236 may select an IVR function specified in the message.

Provisioning 1240 also includes connect 1242 the caller to an agent for real-time communication in response to the caller selecting the one or more functions of the IVR message. For example, the media sever 2300 that is hosted by the cloud computing system 2010 may connect the caller 236 with the agent 237 in response to the caller 236 selecting an IVR function that specifies agent 237 connection.

Figure 13:
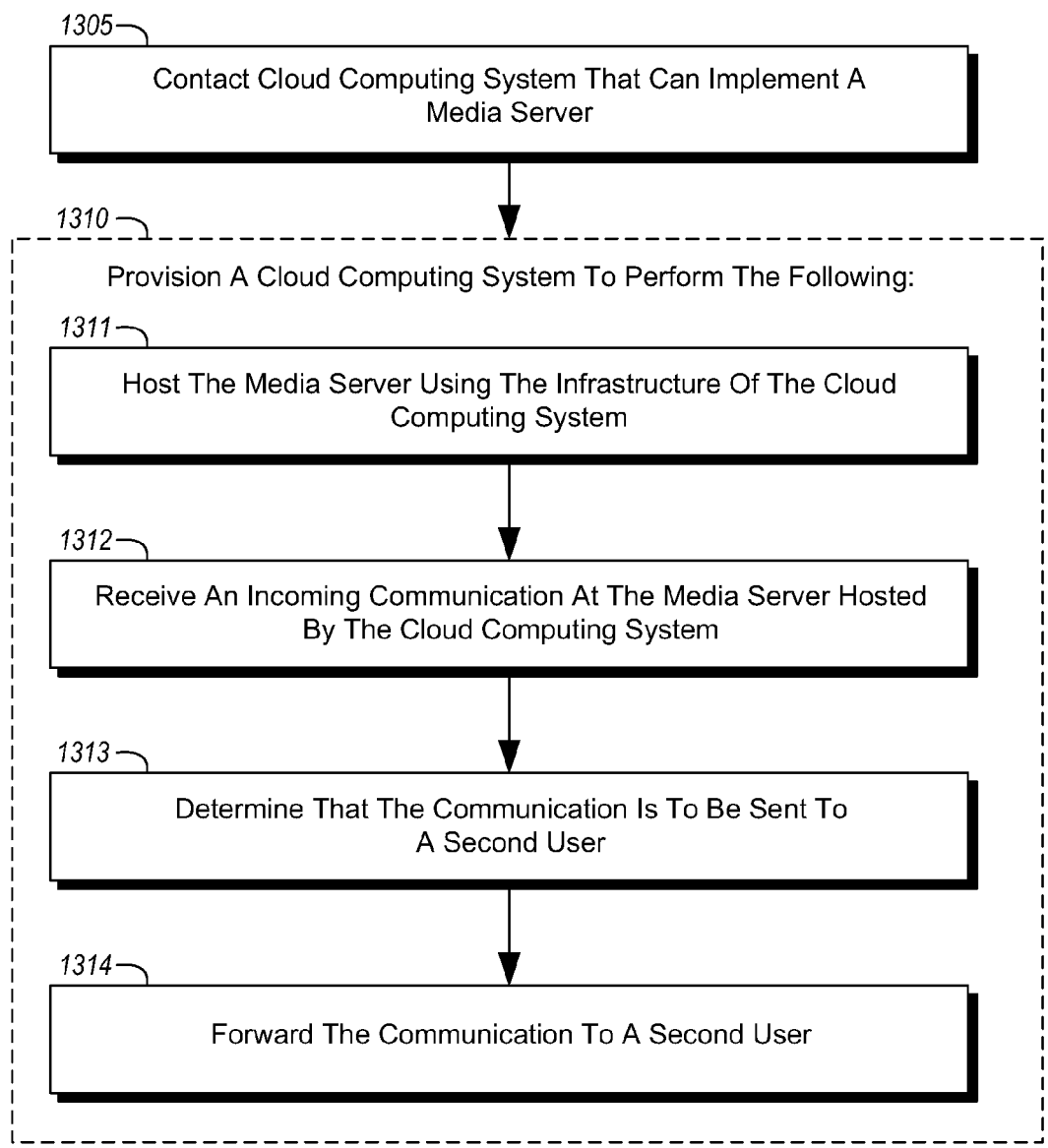
FIG. 13 illustrates the flowchart of a method for provisioning a cloud computing system to implement a media server in response to increased demand on an existing media server.

FIG. 13 illustrates a flowchart of a method 1300 for implementing a media server that is part of a telephony system in a cloud computing system. The method 1300 includes contacting 1305 a cloud computing system that has infrastructure that can implement a media server. For example, the data center 210 may contact the cloud computing system 2010 to implement the media server 2300.

The method 1300 includes provisioning 1310 a cloud computing environment to perform the following: host 1311 the media server using the infrastructure of the cloud computing system. For example, the data center 210 may provide information 2030 to the cloud computing system 2010. The information 2030 may provision the cloud computing system 2010 to implement the media server 2300.

Provisioning 1310 also includes receive 1312 an incoming communication at the media server hosted by the cloud computing system. For example, the media sever 2300 that is hosted by the cloud computing system 2010 may receive an incoming call from the caller 236.

Provisioning 1310 also includes determine 1313, based on the incoming communication, that the communication is to be sent to a second user. The media server is hosted by the cloud computing environment with cloud computing infrastructure. For example, the media sever 2300 that is hosted by the cloud computing system 2010 may determine, based on the call received from the caller 236 that the incoming call should be sent to the agent or user 237.

Provisioning 1310 also includes forward 1314 the communication to the second user. For example, the media sever 2300 that is hosted by the cloud computing system 2010 may forward the incoming call from the caller 236 to the agent or user 237.

As mentioned previously, in one embodiment the media server 2300 is configured to be an IXC or LEC in a telephony system. In such embodiments, the media server may perform the following method to connect two callers so that a call or other communication may be shared by the two callers. The method includes receiving an incoming call from a first caller. For example, the media server 2300, acting as an IXC or LEC in a telephony system, may receive an incoming call from the caller 236.

The method may also include determining, based on the incoming call, who the recipient of the call is to be. For example, the media server 2300, acting as an IXC or LEC in a telephony system, may determine in the various ways described previously who is to receive the incoming call from the caller 236. For instance, the media server 2300 may determine that the caller 237 is to receive the call from the caller 236.

The method may also include providing the incoming call to a second caller. For example, the media server 2300, acting as an IXC or LEC in a telephony system, may provide the incoming call to the second caller 237. In this way, the media server 2300 is able to connect the caller 236 and the caller 237 without the need to backhaul any communication to the data center.

FIG. 14 illustrates a flowchart of a method 1400 for provisioning a cloud computing system to increase media server resources when demand increases. The method 1400 includes determining 1410 that demand for resources of an existing media server in a location has increased to a level where it is desirable for additional media server resources. For example, the data center 210 or the media server 2300 may determine that that demands on the media server 2300 have reached a point that it is necessary to implement additional media server resources as the media server 2300 can no longer handle all the communication traffic.

The method 1400 also includes contacting 1420 a cloud computing system that is located in the location of the existing media server. For example, the data center 210 or the media server 2300 may contact the cloud computing system 2010.

The method 1400 further includes provisioning 1430 the cloud computing system to implement additional media server resources that are similar to the resources of the existing media server so as to remove demand from the existing media server. For example, the data center 210 or the media server 2300 may provision the cloud computing system 2010 to implement the media server 231. As previously discussed, the media server 231 functions in the same manner as the media server 2300. When it is determined that the demand on the media server 2300 has dropped to a level that can be handled by the media server 2300, the cloud computing system 2010 may discontinue to implement the media server 231.

Figure 9:
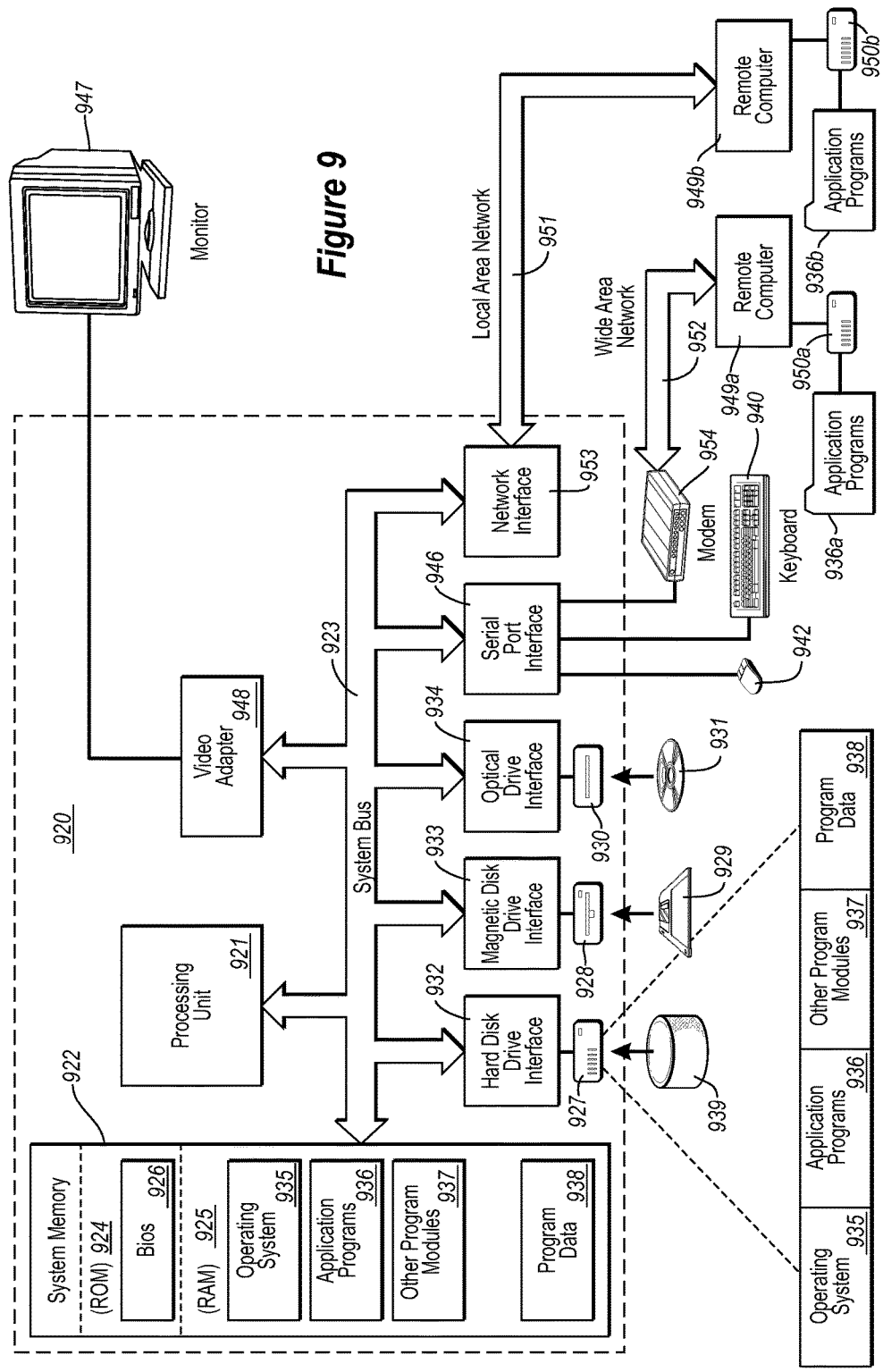
FIG. 9 illustrates a suitable computing environment in which embodiments may be implemented.

FIG. 9 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular actions or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where actions are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 9, an example system for implementing the invention includes a general purpose computing device in the form of a conventional computer 920, including a processing unit 921, a system memory 922, and a system bus 923 that couples various system components including the system memory 922 to the processing unit 921. It should be noted however, that as mobile phones become more sophisticated, mobile phones are beginning to incorporate many of the components illustrated for conventional computer 920. Accordingly, with relatively minor adjustments, mostly with respect to input/output devices, the description of conventional computer 920 applies equally to mobile phones. The system bus 923 may be any of several types of bus structures including a memory bus or memory controller, a peripheral bus, and a local bus using any of a variety of bus architectures. The system memory includes read only memory (ROM) 924 and random access memory (RAM) 925. A basic input/output system (BIOS) 926, containing the basic routines that help transfer information between elements within the computer 920, such as during start-up, may be stored in ROM 924.

The computer 920 may also include a magnetic hard disk drive 927 for reading from and writing to a magnetic hard disk 939, a magnetic disk drive 928 for reading from or writing to a removable magnetic disk 929, and an optical disc drive 930 for reading from or writing to removable optical disc 931 such as a CD-ROM or other optical media. The magnetic hard disk drive 927, magnetic disk drive 928, and optical disc drive 930 are connected to the system bus 923 by a hard disk drive interface 932, a magnetic disk drive-interface 933, and an optical drive interface 934, respectively. The drives and their associated computer-readable media provide nonvolatile storage of computer-executable instructions, data structures, program modules and other data for the computer 920. Although the exemplary environment described herein employs a magnetic hard disk 939, a removable magnetic disk 929 and a removable optical disc 931, other types of computer readable media for storing data can be used, including magnetic cassettes, flash memory cards, digital versatile discs, RAMs, ROMs, and the like.

Program code means comprising one or more program modules may be stored on the hard disk 939, magnetic disk 929, optical disc 931, ROM 924 or RAM 925, including an operating system 935, one or more application programs 936, other program modules 937, and program data 938. A user may enter commands and information into the computer 920 through keyboard 940, pointing device 942, or other input devices (not shown), such as a microphone, joy stick, game pad, satellite dish, scanner, or the like. These and other input devices are often connected to the processing unit 921 through a serial port interface 946 coupled to system bus 923. Alternatively, the input devices may be connected by other interfaces, such as a parallel port, a game port or a universal serial bus (USB). A monitor 947 or another display device is also connected to system bus 923 via an interface, such as video adapter 948. In addition to the monitor, personal computers typically include other peripheral output devices (not shown), such as speakers and printers.

The computer 920 may operate in a networked environment using logical connections to one or more remote computers, such as remote computers 949*a* and 949*b*. Remote computers 949*a* and 949*b* may each be another personal computer, a server, a router, a network PC, a peer device or other common network node, and typically include many or all of the elements described above relative to the computer 920, although only memory storage devices 950*a* and 950*b* and their associated application programs 936*a* and 936*b* have been illustrated in FIG. 9. The logical connections depicted in FIG. 9 include a local area network (LAN) 951 and a wide area network (WAN) 952 that are presented here by way of example and not limitation. Such networking environments are commonplace in office-wide or enterprise-wide computer networks, intranets and the Internet.

When used in a LAN networking environment, the computer 920 is connected to the local network 951 through a network interface or adapter 953. When used in a WAN networking environment, the computer 920 may include a modem 954, a wireless link, or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing communications over wide area network 952 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system including a data center, a telephony system or contact handling system including an existing media server hosted by permanent computing infrastructure, a method comprising:
contacting a cloud computing system that has available infrastructure that can be used to implement the additional media server of the telephony system or contact handling system, the cloud computing system being a pool of configurable computing resources configured to be shared between the telephony system or contact handling system and at least one other system;
provisioning the cloud computing system to perform the following:
host the additional media server using the infrastructure of the cloud computing system;
receive an incoming communication from the first user at the additional media server hosted by the cloud computing system;
determine, based on the incoming communication, that the communication is to be sent to the second user; and
forward the communication to the second user so that the first and second users are able to communicate in real time with each other
determining that a level of use of the cloud computing system warrants additional permanent computing infrastructure dedicated to the telephony system or contact handling system to be installed to host a dedicated additional media server dedicated to the telephony system or contact handling system;
arranging for installation of the additional permanent computing infrastructure; and
discontinuing use of the additional media server of the cloud computing system once the additional permanent computing infrastructure dedicated to the telephony system or contact handling system is installed and is hosting the dedicated additional media server.

2. The method in accordance with claim 1, wherein the incoming communication is first backhauled to the data center prior to the first and second users being connected to each other.

3. The method in accordance with claim 1, further comprising receiving an invoice for use of the cloud computing system that is based on a level of use of resources of the cloud computing system.

4. The method in accordance with claim 1, wherein the data center, the additional media server and the cloud computing system that hosts the additional media server are in close proximity to each other, are in the same country, or are in the same physical location.

5. The method in accordance with claim 1, wherein the data center is located in a first location and the additional media server and the cloud computing system that hosts the additional media server are located in a second location that is remote from the first location.

6. In a computing system including a data center and an existing media server, the data center including one or more Interactive Voice Recognition (IVR) functions that are configured for use with a caller who initiates contact with the data center and the existing media server configured to provide end-point-connection functions, a method comprising:
provisioning a cloud computing environment including a pool of configurable computing resources configured to be shared between the data center and at least one other system to perform the following:
host the additional media server using the infrastructure of the cloud computing system;
receive an incoming communication at the additional media server hosted by the cloud computing system;
determine, based on the incoming communication, that the communication is to be sent to the data center;
forward the communication to the data center;
receiving the communication at the data center; and
transmit an IVR message response to the additional media server hosted by the cloud computing system;
provisioning the cloud computing environment to perform the following:
forward the IVR message response to the caller to allow the caller to select one or more functions specified in the IVR message; and
connect the caller to an agent for real-time communication in response to the caller selecting the one or more functions of the IVR message;
determining that a level of use of the cloud computing system warrants additional permanent computing infrastructure dedicated to the data center to be installed to host a dedicated additional media server dedicated to the data center;
arranging for installation of the additional permanent computing infrastructure; and
discontinuing use of the additional media server of the cloud computing system once the additional permanent computing infrastructure dedicated to the data center is installed and is hosting the dedicated additional media server.

7. The method in accordance with claim 6, wherein the cloud computing environment is a first cloud computing environment, the additional media server is a first additional media server, the incoming communication is a first incoming communication, the IVR message is a first IVR message, the agent is a first agent and the caller is a first caller, the method further comprising:
provisioning a second cloud computing environment to perform the following:
host a second additional media server using infrastructure of a second cloud computing environment;
receive a second incoming communication at the second additional media server hosted by the second cloud computing system;
determine, based on the incoming communication, that the communication is to be sent to the data center;
forward the communication to the data center;
receive a second IVR message response from the data center;
forward the second IVR message response to the second caller to allow the second caller to select one or more functions specified in the second IVR message; and
connect the second caller to the second agent for real-time communication in response to the caller selecting the one or more functions of the second IVR message.

8. The method in accordance with claim 6, wherein the incoming communication is first backhauled to the data center prior to the first and second users being connected to each other.

9. The method in accordance with claim 6, further comprising receiving an invoice for use of the cloud computing system that is based on a level of use of resources of the cloud computing system.

10. The method in accordance with claim 6, wherein the data center, the additional media server and the cloud computing environment that hosts the additional media server are in close proximity to each other, are in the same country, or are in the same physical location.

11. The method in accordance with claim 6, wherein the data center is located in a first location and the additional media server and the cloud computing system that hosts the additional media server are located in a second location that is remote from the first location.

* * * * *